(12) United States Patent
Sanada et al.

(10) Patent No.: US 6,773,626 B2
(45) Date of Patent: Aug. 10, 2004

(54) REVERSIBLE INFORMATION DISPLAY MEDIUM OF LIQUID CRYSTAL TYPE AND NON-CONTACT IC CARD UTILIZING THE SAME

(75) Inventors: Satoshi Sanada, Tokyo (JP); Masayuki Hatano, Tokyo (JP)

(73) Assignee: Tokyo Magnetic Printing Co., Ltd., Tokyo (JP)

( * ) Notice: Subject to any disclaimer, the term of this patent is extended or adjusted under 35 U.S.C. 154(b) by 0 days.

(21) Appl. No.: 09/970,162

(22) Filed: Sep. 26, 2001

(65) Prior Publication Data

US 2002/0076511 A1 Jun. 20, 2002

Related U.S. Application Data

(63) Continuation of application No. PCT/JP01/00561, filed on Jan. 29, 2001.

(30) Foreign Application Priority Data

| Feb. 3, 2000 | (JP) | 2000-026205 |
| Mar. 27, 2000 | (JP) | 2000-085685 |
| Nov. 30, 2000 | (JP) | 2000-365014 |
| Jan. 23, 2001 | (JP) | 2001-014585 |

(51) Int. Cl.[7] ............................................. C09K 19/52
(52) U.S. Cl. ................................. 252/299.01; 428/1.1
(58) Field of Search ..................... 428/1.1, 1.2, 1.31; 252/299.01, 299.1; 347/171; 507/129; 349/88, 94

(56) References Cited

U.S. PATENT DOCUMENTS

| 4,896,292 A | | 1/1990 | Eich et al. | |
| 5,354,498 A | | 10/1994 | Inoue et al. | |
| 5,680,185 A | * | 10/1997 | Kobayashi et al. | 349/88 |
| 5,707,543 A | | 1/1998 | Akashi et al. | |
| 5,932,137 A | | 8/1999 | Baba et al. | |
| 5,972,240 A | * | 10/1999 | Kobayashi et al. | 252/299.01 |
| 6,052,137 A | * | 4/2000 | Shamada | 347/171 |
| 6,201,587 B1 | | 3/2001 | Sakamaki | |
| 6,287,646 B1 | * | 9/2001 | Takeuchi et al. | 428/1.1 |

FOREIGN PATENT DOCUMENTS

| CN | 1141329 A | | 1/1997 | |
| CN | 1164106 A | | 11/1997 | |
| EP | 0 523 256 | | 8/1992 | |
| EP | 0 735 519 A2 | | 10/1996 | |
| JP | 59-10930 | | 1/1984 | |
| JP | 63-191673 | | 8/1988 | |
| JP | 63 191673 A | | 8/1988 | |
| JP | 2-219861 | | 9/1990 | |
| JP | 4-110925 | | 4/1992 | |
| JP | 4-260024 | | 9/1992 | |
| JP | 5-156018 | | 6/1993 | |
| JP | 6-265861 | | 9/1994 | |
| JP | 7-104260 | | 4/1995 | |
| JP | 9-1963 | | 1/1997 | |
| JP | 09-001963 | * | 1/1997 | B42D/15/10 |
| JP | 9-218484 | | 8/1997 | |
| JP | 11 021555 A | | 1/1999 | |
| WO | WO 92 02930 A | | 2/1992 | |

OTHER PUBLICATIONS

Computer generated English translation of Shamada Japanese Patent No. 9–1963.*

* cited by examiner

Primary Examiner—Mark F. Huff
Assistant Examiner—Jennifer R. Sadula
(74) Attorney, Agent, or Firm—Cohen, Pontani, Lieberman & Pavane

(57) ABSTRACT

A reversible information liquid crystal display medium is disclosed which is capable of long term information display, even through extremes of heat and pressure, without the addition of energy to maintain the display. A primary ingredient of the liquid crystal display medium is a liquid crystalline composition of high-molecular liquid crystal in which molecules that can function as a liquid crystal are chemically bound to side chains of a high-molecular polymer skeleton through a flexing group. Low-molecular liquid crystal may be added to the liquid crystalline composition in order to reduce the response speed of the liquid crystalline composition. The liquid crystal display medium may be used in the display portion of a contactless integrated circuit (IC) card.

15 Claims, 8 Drawing Sheets

FIG. 6
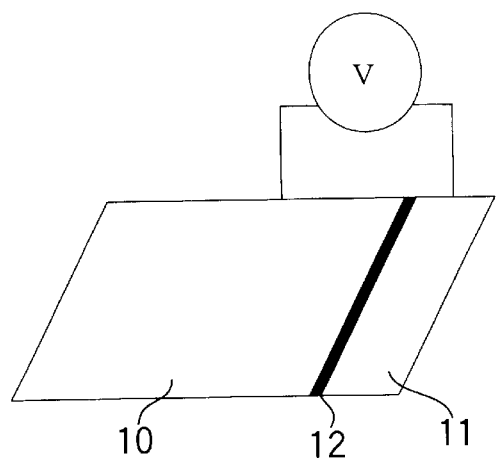
FIG. 7
TABLE 1
| RATE OF ADDITION OF LOW-MOLECULAR LIQUID CRYSTAL (%) | 0 | 10 | 20 | 30 |
|---|---|---|---|---|
| THRESHOLD VOLTAGE (50Hz) | 100V | 50V | 45V | 45V |
FIG. 8
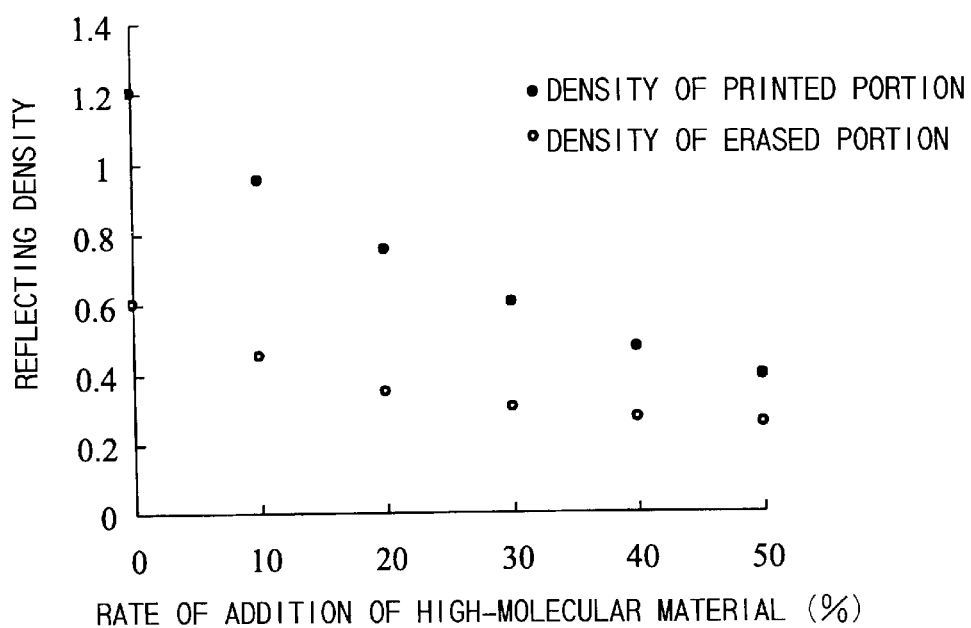

TABLE 2

| EXAMPLES | DENSITY OF ERASED PORTION |
|---|---|
| 6 | 0.6 |
| 7 | 0.3 |

FIG. 11

TABLE 3

| COMPOSITIONS | I-1 | II-1 | ni | THRESHOLD VOLTAGE |
|---|---|---|---|---|
| a | 90% | 10% | 110°C | 50Hz, 5V |
| b | 70% | 30% | 107°C | 50Hz, 3V |
| c | 50% | 50% | 105°C | 50Hz, 3V |

FIG. 12

TABLE 4

| COMPOSITIONS | HOMEOTROPIC ORIENTATION | ISOTROPIC LIQUID STATE OR DOMAIN |
|---|---|---|
| I-1 | 69.83% | 11.47% |
| b | 68.98% | 11.58% |
| c | 69.63% | 39.07% |
| LOW-MOLECULAR LIQUID CRYSTAL | 68.52% | 38.30% |

FIG. 13

TABLE 5

| COMPOSITIONS | I-2 | II-2 | II-3 |
|---|---|---|---|
| d | 90% | 10% | |
| e | 90% | | 10% |
| f | 80% | | 20% |

FIG. 18
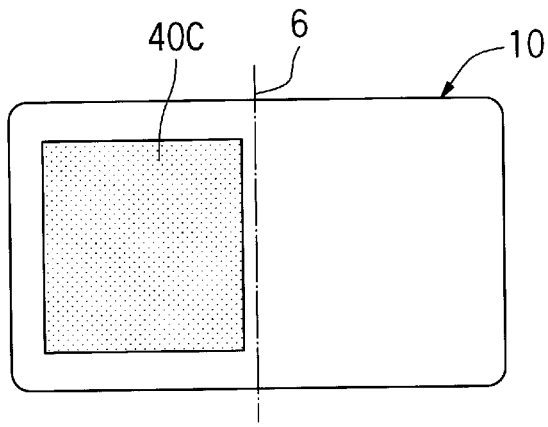
FIG. 19
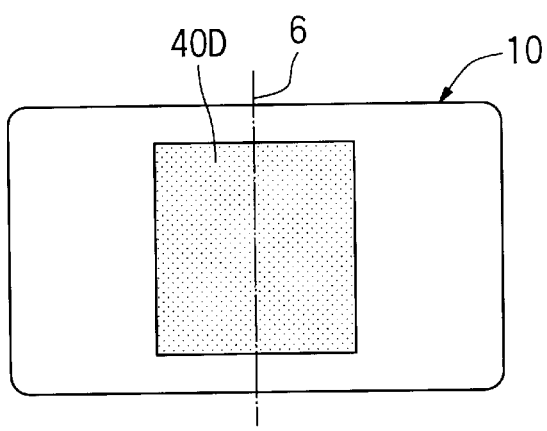
FIG. 20
TABLE 6
| CONFIGURATION OF CONDUCTIVE LAYER | COMMUNICATION DISTANCE (mm) | RELATIVE VALUE (%) |
|---|---|---|
| NO CONDUCTIVE LAYER | 55.0 | 100 |
| POSITIONED AT THE SIDE (FIG.18) | 53.0 | 96.4 |
| POSITIONED AT THE CENTER (FIG.19) | 50.4 | 91.6 |

REVERSIBLE INFORMATION DISPLAY MEDIUM OF LIQUID CRYSTAL TYPE AND NON-CONTACT IC CARD UTILIZING THE SAME

This application is a Continuation Application under 35 USC 371 of International Application PCT/JP01/00561 (not published in English) filed on Jan. 29, 2001.

TECHNICAL FIELD

This invention relates to information displaying medium and more particularly, to reversible information displaying medium which may be used as a rewritable paper, a displaying sheet for OHP, the displaying section of a magnetic card and the displaying section of an IC card.

BACKGROUND ART

Recently, a very large amount of paper and plastic has been used for displaying or recording information, which would cause various problems in resources and environments. Furthermore, information recording cards have been developed for various uses or purposes and thus information recording cards having displaying performance are required. The displaying section of cards and the like is preferably repeatedly writable and erasable so that disused information may be erased and instead necessary information are written. Moreover, displaying medium having security so that displayed information may not easily be rewritten are required.

Displaying medium which are repeatedly writable and erasable include reversible thermal displaying medium comprising a high-polymer matrix and an organic low molecular compound dispersed therein so that scattering and transmission of light may be controlled by controlling heat to be applied for display, displaying medium comprising a film having a plurality of high-polymers blended together so that phase separation may be controlled by heat for display, reversible thermal recording medium using a leuco pigment and a developer, and magnetic recording medium comprising micro-capsules containing dispersing agents in solid state at normal temperature and magnetic powder dispersed therein so that magnetic powder may be moved to the upper portion or the lower portion of the capsule by magnetic field applied under heating for display.

Information displaying medium which utilize change in orientation of liquid crystal material have been proposed, which are superior to the methods mentioned above on visibility and durability. Among method employing low molecular liquid crystal materials there has been proposed a displaying element comprising liquid crystal/high polymer composite film wherein liquid crystal molecules exist in high polymer matrix.

Moreover, a system employing high-molecular liquid crystal memorizing display and having film production performance has been proposed. High polymer liquid crystal is one wherein molecules (mesogen) presenting the nature of liquid crystal are chemically bound to the side chains of high molecular polymer skeleton through a flexing group, whereby settlement of liquid crystal phase is easily made at a temperature lower than glass transformation temperature Tg. Japanese Patent Application Publication Tokkai-sho 63-191673 discloses an example employing such a high-molecular liquid crystal. In the reversible displaying medium as disclosed in the publication, scattering of light under liquid crystal domain state and transmission of light under isotropic liquid state are controlled by controlling heat to be applied for display.

Furthermore, Japanese Patent Application Publication Tokkai-sho 59-10930 discloses an information recording medium which utilizes changes in orientation when heat and electric field is applied to high-molecular liquid crystal or when heat is applied to high-molecular liquid crystal. Also, Japanese Patent Application Publication Tokkai-hei 2-219861 discloses a method of improving a response speed by using a ferroelectrics high-molecular liquid crystal. Japanese Patent Application Publications Tokkai-hei 4-110925 and Tokkai-hei 6-265861 discloses a method of improving a response speed by adding nematic liquid crystal to high-molecular liquid crystal to form smectic phase.

However, conventional systems of displaying element employing liquid crystal/high polymer composite film as mentioned above have problems that a large amount of high polymer material is required for formation of liquid crystal recording layer and that in case of adding dichromatic pigment or the like to be used as host-guest system, diffusion of dichromatic pigment into high polymer material deteriorates contrast.

Moreover, the method as disclosed in Tokkai-sho 63-191673 has problems that slow change of orientation to isotropic liquid state or microscopically dispersed liquid crystal domain state at a temperature higher than Tg of high-molecular liquid crystal necessitates annealing process, thereby resulting in taking a longer time for rewriting.

Moreover, the information recording medium of Tokkai-sho 59-10930 has a problem that speed of orientation in simple high-molecular liquid crystal is very low, not suitable for practical use. Also, the method of Tokkai-hei 2-219861 has problems that orientation process is required when ferroelectrics liquid crystal is used and chiral agent needs to be introduced into high-molecular liquid crystal, thereby resulting in difficulty in synthesizing and high cost. Moreover, the methods as disclosed in Tokkai-hei 4-110925 and Tokkai-hei 6-265861 have a problem that smectic phase changes in orientation according to pressure, thereby resulting in deteriorating durability and conservativity or storability.

Moreover, in these methods, formation or erasing of image is easily made by means of a single energy, thereby resulting in easy tampering of the contents of display.

Under the circumstances mentioned above, there is a strong demand for the advent of an information displaying medium having the following features: they can be used as a rewritable paper, a displaying sheet for OHP, the displaying section of a magnetic card and the displaying section of an IC card; contrast is not deteriorated even if used for a long period or repeatedly used; contrast is not deteriorated due to pressure applied; and they have good conservativity, durability, visibility and resistant to tampering in use at high temperature.

Therefore, an object of this invention is to provide a reversible information displaying medium having such features as mentioned above and a non-contact IC card utilizing such reversible information displaying medium.

DISCLOSURE OF THE INVENTION

According to one aspect of the present invention, the present reversible information display medium of liquid crystal type comprises a recording layer comprising (1) a liquid crystalline composition whose main component exhibits a glass state at room temperature and (2) a dichroic dye, the liquid crystalline composition exhibiting an isotropic liquid state or a liquid crystal domain state by the application of heat and further exhibiting a homeotropic orientation state by the application of both heat and electric field, the formation of letters, images and the like by the application of heat and the elimination thereof by the application of heat and electrical field being able to be carried out, and the images being able to be retained at room temperature even when the application of heat and electrical field is cut.

According to one embodiment of the present invention, the present liquid crystal composition is a high-molecular polymer liquid crystal.

According to one embodiment of the present invention, the high-molecular liquid crystal has a side chain represented by the following general formula (1):

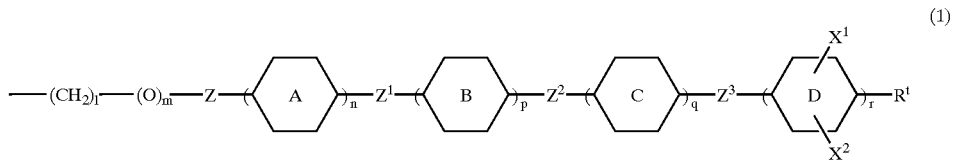

wherein
rings A, B, C and D independently represent an aromatic or aliphatic hydrocarbon 6 membered ring or a heterocyclic or fused ring;
Z, $Z^1$, $Z^2$ and $Z^3$ independently represent a single bond, $—CH_2O—$, $—OCH_2—$, $—COO—$, $—OCO—$, $—CH_2—$, $—CH_2CH_2—$, $—CH=CH—$, $—CF=CF—$ or $—C{\equiv}C—$;
$R^1$ represents a hydrogen atom, a $C_{1-8}$ straight or branched chain alkyl, alkoxy, alkoxyalkyl or fluoroalkyl group, a cyano group, a halogen atom, a carboxyl group or a hydroxyl group;
$X^1$ and $X^2$ each independently represents a hydrogen atom, a halogen atom or a cyano group;
l is 1 to 20;
m is 0 or 1;
n, p, q and r are independently 0 to 2; and
$n+p+q+r \geq 1$.

According to another embodiment of the present invention, the present liquid crystal composition is a mixture of a high-molecular liquid crystal and low-molecular liquid crystal.

According to one embodiment of the present invention, the low-molecular liquid crystal is represented by the following general formula (2):

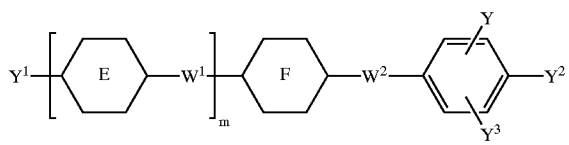

wherein
$Y^1$ represents a hydrogen atom or a $C_{1-8}$ straight or branched chain alkyl, alkoxy, alkenyl, alkenyloxy, alkoxyalkyl, alkanoyloxy or alkoxycarbonyl group;
rings E and F independently represent a benzene, cyclohexane, cyclohexene, pyrimidine or dioxane ring;
$W^1$ and $W^2$ independently represent a single bond, $—CH_2O—$, $—OCH_2—$, $—COO—$, $—OCO—$, $—CH_2—$, $—CH_2CH_2—$, $—CH=CH—$ or $—C{\equiv}C—$;

Y represents a hydrogen or halogen atom;
$Y^2$ represents a cyano group, a halogen atom, a $C_{1-8}$ straight or branched chain alkyl, alkoxy, alkenyl, alkenyloxy, alkoxyalkyl or alkanoyloxy group or a cyano group;
$Y^3$ represents a hydrogen atom, a halogen atom or a cyano group; and
m is 0 to 2.

According to a preferred embodiment of this invention, the contents of said low-molecular liquid crystal in said liquid crystal composition is 30% by weight or below of said high-molecular liquid crystal.

According to another embodiment of this invention, said recording layer is formed on an electrically conductive substrate.

According to another embodiment of this invention, said electrically conductive substrate is transparent and a reflecting layer or a white color layer is formed on the bottom surface of substrate through an air layer.

According to another embodiment of this invention, said recording layer is formed on an electrically conductive layer formed on a substrate.

According to another embodiment of this invention, said substrate and said electrically conductive layer are transparent and a reflecting layer or a white color layer is formed on the bottom surface of said substrate through an air layer.

According to another embodiment of this invention, said electrically conductive layer is transparent, an air layer is provided between said substrate and said electrically conductive layer, and a reflecting layer or a white color layer is formed on the top surface of said substrate.

According to another embodiment of this invention, an ultraviolet rays absorbing layer or a protective layer is formed on said recording layer.

According to a preferred embodiment of the invention, fluorine surface-active agent of 5% by weight of said liquid crystal composition is contained in said recording layer.

According to a preferred embodiment of this invention, high polymer resin of 20% by weight or below of said liquid crystal composition is contained in said recording layer.

According to a preferred embodiment of this invention, filler of 20% by weight or below of said liquid crystal composition is contained in said recording layer.

According to a preferred embodiment of this invention, ultraviolet rays absorbing agent is contained in said recording layer.

According to another aspect of this invention, there is provided a non-contact IC card comprising a rewritable information displaying section utilizing a liquid crystal type reversible information displaying medium as mentioned above and an antenna section coupled to an IC tip section.

According to one embodiment of this invention, the area of the electrically conductive layer or the metallic reflecting layer of said information displaying section is equal to or smaller than 50% of the area of said card.

According to another embodiment of this invention, the electrically conductive layer or the metallic reflecting layer of said information displaying section is divided into two or more regions, and the area of each of said regions is equal to or smaller than 50% of the area of said card.

BRIEF DESCRIPTION OF THE DRAWINGS

Embodiments of the present invention will now be described in more detail with reference to the accompanying drawings, in which:

FIG. 6 is a conceptual view illustrating a plate for applying an electric field for use in erasing an image display on an information display medium according to the present invention;

FIG. 7 is a table 1 of experimental data representing a relationship between the rate of addition of low-molecular liquid crystal and the threshold voltage;

FIG. 8 is a graph showing a change in density of colored or colorless state with addition of a resin;

FIG. 11 is a table 3 representing measurement result for percentage of components within compositions for use in a ninth embodiment;

FIG. 12 is a table 4 representing measurement result for percentage of components within compositions for use in a tenth embodiment;

FIG. 13 is a table 5 representing measurement result for percentage of components within compositions for use in a twelfth embodiment;

FIG. 18 is a schematic plan view illustrating a non-contact IC card according to yet further embodiment of the present invention;

FIG. 19 is a schematic plan view illustrating a non-contact IC card similar to that in FIG. 18, but an information display portion having the equal area is centrically positioned; and FIG. 20 is a table 6 representing measurement results for communication distance for both non-contact IC cards in FIGS. 18 and 19.

PREFERRED EMBODIMENT FOR CARRYING OUT THE INVENTION

Firstly, before describing various embodiments of this invention, the concept of this invention will be described. Liquid crystal composition as used in this invention may utilize high molecular liquid crystal or a mixture of high-molecular liquid crystal and lower molecular liquid crystal. The high-molecular liquid crystal is one wherein molecules (mesogen) presenting the nature of liquid crystal are chemically bound to the side chains of high-molecular skeleton through a flexing group, whereby settlement of liquid crystal phase is easily made at a temperature lower than glass transformation temperature Tg. Since the viscosity of the high-molecular liquid crystal at a temperature at which liquid crystal phase is presented (hereinafter, referred to as a liquid crystal phase temperature) is very high, it has a very low response to electric field and heat. However, it will be possible to lower the viscosity of liquid crystal phase by mixing low-molecular liquid crystal which has compatibility with high-molecular liquid crystal in mixed condition and thus to improve the response speed. In this case, change in orientation due to pressure can be suppressed by preparing the liquid crystal composition so as to present glass condition at a room temperature.

The liquid crystal composition as used in this invention takes either of isotropic liquid state (transparent dichromatic pigment color) and liquid crystal domain state (masking or shielding dichromatic pigment color) at a temperature lower than the liquid crystal phase temperature. The stability between homeotropic orientation (colorless) and isotropic liquid state, liquid crystal domain state (colored) is very high. It is stable even at a temperature higher than Tg of high-molecular liquid crystal. The state of orientation may be maintained up to a temperature in vicinity of liquid crystal phase temperature so as to provide a good conservativity or storability of display at a high temperature. Moreover, since heat and electric field are required to form erased state (colorless), it has a good resistant to tampering.

Figure 1:
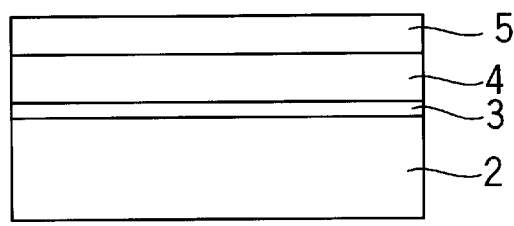
FIG. 1 is a cross sectional view illustrating an exemplary model of layered configuration of an information display medium according to one embodiment of the present invention.

FIG. 1 shows diagrammatically a cross-section of a liquid crystal type reversible information displaying medium according to an embodiment of this invention. As shown in FIG. 1, the information displaying medium comprises a substrate 2, an electrically conductive layer 3, a liquid crystal recording layer 4 and a protective layer 5.

In the present invention, as substrate 2, can be used sheet having a stiffness sufficient for being able to be carried, for example, a sheet having a thickness of about 25 to 1000 μm, such as a polyester film e.g., a polyethylene terephthalate film and a polybutylene terephthalate film; an acrylic resin film, e.g., a polymethyl methacrylate, polymethyl acrylate and polyethylmethacrylate; furthermore, polystyrene, an acrylonitrile-butadiene-styrene copolymer, triacetic acid cellulose, polycarbonate film and polyimide films. In addition, usual papers such as art paper, coated paper, woodfree paper, synthetic paper; metallic foil; ceramic sheet and the like may be used as substrate 2.

As substrate 2 having an electrical conductivity, may be used, for example, metallic foil of aluminum, chromium, nickel, cobalt, copper, silver, gold, tin, zinc, brass and stainless steel, and electrically conductive organic materials such as carbon black, and metal such as aluminum, chromium, nickel, cobalt, copper, silver, gold, tin, zinc, stainless steel; and oxide and nitride thereof, furthermore, electrical conductive films prepared by incorporating electrical conductive materials such as ZnOx and In—Sn—Ox into polyester films such as polyethylene terephthalate and polybutylene terephthalate film; acrylic resin films such as polymethyl methacrylate, polymethyl acrylate and polyethylene methacrylate, furthermore a polystyrene film, an acrylonitrile-butadiene-styrene copolymer film, triacetic acid cellulose film, polycarbonate film, polyimide film and the like.

The electrically conductive layer 3 on the top of the substrate 2 may be formed from any electrically conductive material including electrically conductive organic material such as carbon black; metal material such as aluminum, chromium, nickel, cobalt, cupper, silver, gold, tin, zinc, bronze, stainless steal; or any oxide or nitride thereof. In addition, the electrically conductive layer 3 may be any one of the followings: a transparent conductive layer of ZnOx, In—Sn—Ox, etc.; a vapor evaporated layer; a spattered layer; an electroless plated layer; a thermal sprayed layer; a foil layer; or any coating layer that may be formed from any coating agent using a common coating procedure in which a powder of any of above-mentioned conductive material is produced and it is dispersed into a resin to form the coating agent. Such layer is normally deposited on the substrate 2 in the thickness of 0.01 to 50 $\mu$m. In case where the vapor deposition or sputtering is used to form the conductive layer on the substrate, it is preferable that the conductive layer is formed after depositing any anchor coat layer on the base member in order to keep a uniform thickness for the conductive layer. In case where the conductive layer is formed from any metal material giving a glossy surface, it also acts as the reflective layer for producing higher contrast image. In such case, however, it may happen that the reflected component becomes stronger to narrower the angle of view field if there is a mirror-like surface on the conductive layer. Therefore, it is preferable that the surface of the conductive layer is roughened to some degree. The roughness of the surface of the conductive layer may be adjusted depending on the amount of filler added to the base member, or added to the coating liquid for the anchor coat layer on the substrate.

The conductive layer 3 may be entirely or partly formed on the substrate 2 of the information record medium.

In case of the transparent conductive layer 3, the color of the substrate 2 is visible. Therefore, when any milk white polyethylene terephthalate film is used for the substrate 2 or it is coated with any white coating agent, then display of the dichromatic pigment color on the white background is permitted. Alternatively, in case of the colored or reflective conductive layer 3, the white coating agent may be applied to the conductive layer 3 for permitting display of the dichromatic pigment color on the white background.

In addition, in case of using the transparent conductive layer 3, any sheet having higher transparency may be used for the substrate and any reflective or white layer may be formed on the rear surface of the sheet with intervention of an air layer therebetween, with the result that appearance of color of the background due to the dichromatic pigment may be reduced. Alternatively, when using the transparent conductive layer 3, an air layer may be formed between the conductive layer 3 and the substrate 2 and any reflective or white layer may be formed on the top surface of the substrate 2 to provide the same effect as above.

Figure 2:
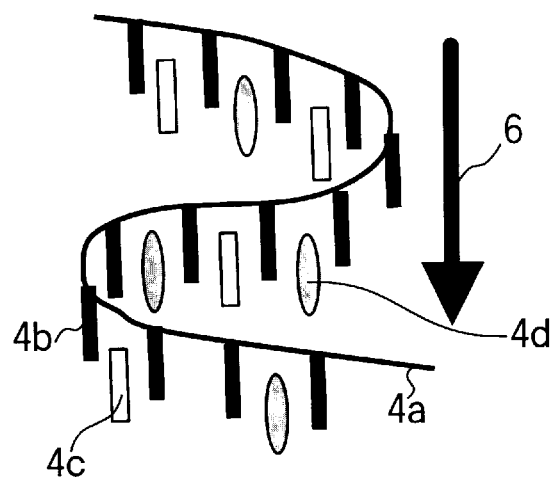
FIG. 2 is a view illustrating a state in which a heat and an electric field are applied to a recording layer according to the present invention so that a liquid crystal layer presents homeotropic orientation.
Figure 3:
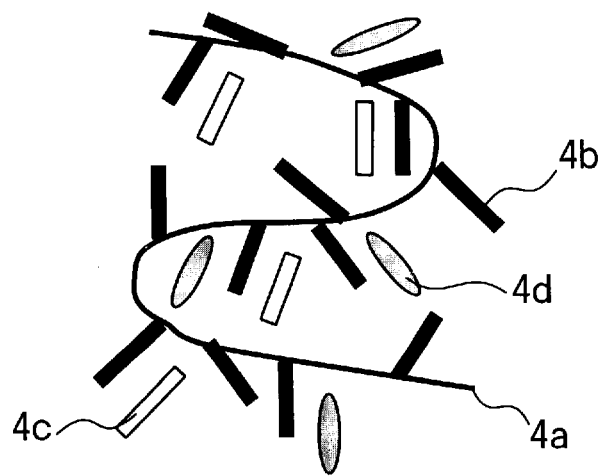
FIG. 3 is a view illustrating a state in which a heat is applied to a recording layer according to the present invention until liquid crystal phase temperature or isotropic liquid temperature for liquid crystal high-molecule is reached, and thereafter, it is quenched so that the liquid crystal is randomly orientated.
Figure 4:
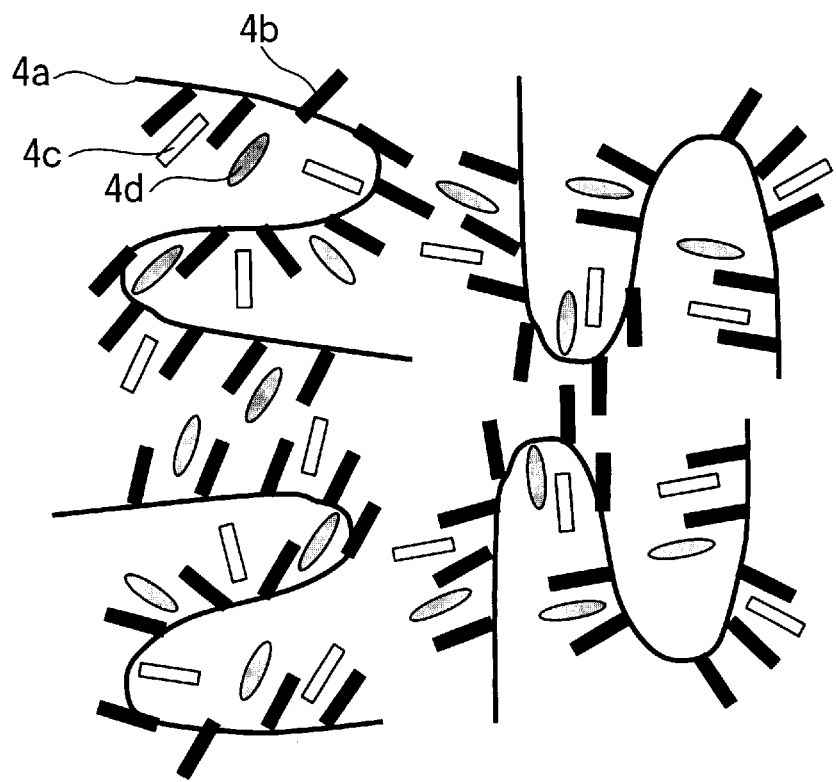
FIG. 4 is a view illustrating a state in which a heat is applied to a recording layer according to the present invention until liquid crystal phase temperature or isotropic liquid temperature for liquid crystal high-molecule is reached, and thereafter, it is gradually cooled so that the liquid crystal presents a domain.

The recording layer 4 used in the present invention will be explained. FIGS. 2, 3 and 4 respectively illustrate the phase condition of the main components constituting the liquid crystal recording layer. In these figures, reference 4a represents a main chain of high-molecular liquid crystal, reference 4b a mesogen of the high-molecular liquid crystal, and reference 4c a low-molecular liquid crystal, and reference 4d represents dichroic dyes. The high-molecular liquid crystal usable in the present invention is that wherein the molecule (mesogen) which can function as a liquid crystal is chemically bound to the side chains of high molecular skeleton through a flexing group. The high-molecular liquid crystal can be changed in orientation by an electric field 6 at a liquid crystal phase temperature, can provide a glassy state at a liquid crystal phase temperature and below, and can fix its liquid crystal phase. The high-molecular liquid crystal of side chain type may be synthesized by addition polymerizing of an acrylic ester, a methacrylic ester and a monomer bound to stylene through flexing chains, or the addition reaction with vinyl substituted mesogenic monomers to polysiloxane skeletons such as poly [oxy(methylsilylene)]. The polymerization reaction may include copolymerization reaction. A crosslinking site or various mesogenic groups can be introduced. While Tg or liquid crystal phase temperature varies depending on polymerization degree, mesogenic species, spacer length, copolymerizing mesogenic species or its ratio. It is practicable that Tg of high-molecular liquid crystal of side chain type is at room temperature or over. It is also preferred that the mesogen group of high-molecular liquid crystal in the invention has electric field response, as liquid crystal phase, such that it may be used in either phase condition of nematic, smectic, and cholesteric phase.

Low-molecular liquid crystal 4c is used for the purpose of lowering the viscosity of the liquid crystal phase in a condition of mixture with high molecular liquid crystal so as to improve the response speed.

Low-molecular liquid crystals having a good compatibility with high-molecular liquid crystal may be preferably used in this invention. More preferably, it has a skeleton similar to the side chain of side chain type high-molecular liquid crystal.

Although the amount of low molecular liquid crystal to be added is influenced by compatibility with high-molecular liquid crystal, low-molecular liquid crystal may be added in an amount so that glass state may be formed in the mixture with high-molecular liquid crystal, preferably in an amount of 30% or below of high-molecular liquid crystal.

Dichromatic pigments 4d can be held by side chain molecules of high-molecular liquid crystal or low-molecular liquid crystal and take the state of orientation similar to that of the side chain molecules or low molecular liquid crystal and perform an optical function similarly with liquid crystal composition. Dichromatic pigment may be either of azo or anthraquinone. It is not limited to a single component. Tone of color may be adjusted by mixing of multi-components. For example, the dichromatic pigment may be M-361, SI-484, M-141, M-484, M-34, SI-497, M-403, S-409, M-412, S-428 commercially available from Mitsui Kagaku K.K., NKX-1366, G-202, G-205, G-206, G-207, G-232, G-239, G-241, G-254, G-256, G-289, G-470, G-471, G-472 commercially available from Nippon Kanko Shikiso K.K., KRD-201, KRD-901, KRD-902, KPD-501, KPD-906, KBD-401, KBD-701, KKD-602, KKD-604 commercially available from Showa Kakoh K.K.

The liquid crystal composition comprising a mixture of high-molecular liquid crystal and low-molecular liquid crystal are highly cohesive so as to have a low wetting. Therefore, the cohesiveness may be lowered by adding fluorine surface-active agent to improve wetting with the electrically conductive layer. For example, the fluorine surface-active agent may be Frolard FC-430, Frolard FC-431, available from Sumitomo 3M K.K., Megafuck F-110, F-116, F-120, F-150, F-160, F-171, F-172, F-173, F-177, F-178A, F-178K, F-179, F-183, F-184, F-191, F-812, F-833 available from Dai Nippon Ink Kagaku Kogyo K.K. When an amount of fluorine surface-active agent to be added increases, paint would be frothy, thereby resulting in deteriorated adherence between the upper and lower layers. For this reason, the amount of fluorine surface-active agent to be added may be preferably 5% by weight of liquid crystal high molecule.

The liquid crystal composition comprising high-molecular liquid crystal or a mixture of liquid crystal high molecule and low-molecular liquid crystal has low fluidity at a temperature lower than liquid crystal phase temperature, but has high fluidity due to lowering of viscosity at liquid crystal phase temperature. Filler or high-molecular material may be added for the purpose of suppressing this fluidity. Moreover, the adding of filler or resin is effective to provide a good adherence between the upper and lower layers.

The filler in the present invention includes organic materials, inorganic materials, organic-inorganic copolymers or composite materials thereof, in particularly, silica, alumina, calcium carbonate, core-shell type particles wherein silica, alumina or calcium carbonate are coated with organic high molecular materials, organic-inorganic composite particles obtained by polycondensation of metallic alkoxides in the presence of organic high molecular materials, polystyrene, styrene-butadiene rubber, polymethyl methacrylate, polyvinyl acetate, poly(methacrylate 2-hydroxyethyl), polyacrylamide, polyacrylic acid, poly(stylene-butylacrylate), polystylene/poly(methacrylate 2-hydexyethyl)complex, poly(stylene-divinylbenzene), cellulose and the like. Preferred refractive index of the particles varies with materials of the primary layer. In case where metal is used as the conductive layer, it is preferable that the refractive index of the particles should differ widely from the refractive index of the high-molecular liquid crystal when the surface of the layer is specular surface, and it is also preferable that the refractive index of the particles should be equivalent to the refractive index of high-molecular liquid crystal when the surface of the layer is roughened to make mat style. It is not preferable that the particle size of the above fillers should be thicker than the membrane thickness of the liquid crystal recording layer because of the smoothness of the membrane. The upper limit of the particle size is 15 μm. The amount of the fillers to be added depends on its particle size. The higher amount is the lower the ratio of the high-molecular liquid crystal, dyes, low-molecular components and the like. Accordingly, the contrast is made worse. Therefore, it is preferable that the amount should be 20% by weight or below.

When the inorganic ultraviolet absorber particles are used as the fillers, the ultraviolet absorbing power may be added to the liquid crystal layer, and the deterioration of the dichroic dyes may be reduced when the ultraviolet curing resin is used in the liquid crystal layer or the intermediate layer. These inorganic ultraviolet absorber particles include particles of titanium oxide, zinc oxide or cerium oxide, and core-shell type particles wherein the surface of these particles is coated with organic high-molecular materials. The addition of the particles to the liquid crystal layer recording layer also has an effect to adjust ground color of the recording layer and the liquid crystal recording layer may be made transmission type and opacity type by changing the particle size or the mixing ratio. Preferred refractive index of the particles vary depending on the kinds of materials used for the primary layer. In case where metal is used as the conductive layer, it is preferable that the refractive index of the particles should differ widely from the refractive index of the high-molecular liquid crystal when the surface of the layer is specular surface, and it is also preferable that the refractive index of the particles should be equivalent to the refractive index of high-molecular liquid crystal when the surface of the layer is roughened to make mat style. It is not preferable that the particle size of the above fillers should be thicker than the membrane thickness of the liquid crystal recording layer because of the smoothness of the membrane. The upper limit of the particle size is 15 μm. The amount of the inorganic ultraviolet absorber particles to be added depends on its particle size. The higher amount is the lower the ratio of the high-molecular liquid crystal, dyes, low-molecular components and the like. Accordingly, the contrast is made worse. Therefore, it is preferable that the amount should be 20% by weight or below.

Preferably, the materials having compatibility with the high-molecular liquid crystal in the monomer or oligomer condition are used in the high-molecular material to be added. It is preferable that such resin material should be ultraviolet curing type. The ultraviolet curing resin includes, for example, acrylic ester and methacrylic ester; polyfunctional monomer, e.g., dipentaerythritol hexa-acrylate, trimethylolpropane triacrylate, polyethyleneglycol diacrylate, polypropyleneglycol diacrylate, polypropyleneglycol diacrylate, iscyanuric acid (ethyleneoxide modified), triacrylate, dipentaerythritol tetraacrylate, triacrylate, dipentaerythritol pentaacrylate, neopentylglycol diacrylate, hexanediol diacrylate, or polyfunctional urethane or ester oligomers, in a monomer or oligomer state; furthermore, mono-functional monomers or oligomers, e.g., of nonylphenol modified acrylate, N-vinyl-2-pyrrolidone, 2-hydroxy-3-phenoxypropylacrylate.

The photo-polymerization initiator for curing the ultraviolet curing resin includes, for example, 2-hydroxy-2-methyl-1-phenylpropan-1-one, 1-hydroxycyclohexyl phenylketone, 1-(4-isopropylphenyl)-2-hydroxy-2-methylpropane-1-one, benzyldimethylketal, and 2-methyl-1-[4-(methylthio)phenyl]-2-morpholinopropa-1-one.

The contents of high molecular material should be 20% by weight or below of high-molecular liquid crystal. When the amount of high-molecular material to be added increases, phase separation between high-molecular liquid crystal and high-molecular material occurs, thereby resulting in deteriorate contrast of display. Moreover, dichromatic pigment melts into high-molecular material part, thereby resulting in further deteriorating contrast due to increase of background density. For this reason, the amount of high molecular material to be added is preferably 20% by weight or below.

Coating solution comprising the components as mentioned above is prepared and applied onto an electrically conductive substrate or an electrically conductive layer to form a liquid crystal recording layer. The concentration of solid component in coating solution for the liquid crystal recording layer is preferably 20 to 60% by weight. For hardening, it will be necessary to set suitably various hardening requirements such as a kind of resin, concentration, temperature of applied layer, ultraviolet irradiation requirements. Suitable coating or applying systems include a blade coating method, reverse coating method, gravure coating method, silk printing method and other methods which can perform uniform coating. The film thickness of the liquid crystal recording layer influences resolution. The film thickness after drying is 1 to 50 µm, preferably 3 to 10 µm so that high resolution may be maintained and operating voltage may be low. It will be undesirable that smaller film thickness would provide low contrast of the information recording section and that larger film thickness would necessitate high operating voltage.

The dichroic dyes added to the liquid crystal recording layer of the present invention may be decomposed by ultraviolet ray, to lost their functions. Therefore, it is also possible that the ultraviolet absorbing layer may be formed onto the liquid crystal recording layer to inhibit the decomposition of the dichroic dyes. The ultraviolet absorbing layer comprises organic ultraviolet absorbers or inorganic ultraviolet absorbers and high-molecular materials. The organic ultraviolet absorbers or the inorganic ultraviolet absorbers are also used in the layer in combination. The organic ultraviolet absorber may be selected from benzophenones, benzotriazoles, anilide oxalates, cyanoacrylates and triazines. The absorber may be either a liquid or solid. The organic ultraviolet absorber includes, for example, 2,4-dihydroxybenzophenone, 2-hydroxy-4-methoxybenzophenone, 2-hydroxy-4-octoxybenzophenone, 2-hydroxy-4-dodecyloxybenzophenone, 2,2'-dihydroxy-4-methoxybenzophenone, 2,2'-dihydroxy-4,4'-dimethoxybenzophenone, 2-hydroxy-4-methoxy-5-sulfobenzophenone, 2-(2'-hydroxy-5'-methylphenyl)benzotriazole, 2-(2'-hydroxy-5'-tert-butylphenyl)benzotriazole, 2-(2'-hydroxy-3',5'-di-tert-butylphenyl)-5-chlorobenzotriazole, 2-(2-hydroxy-3'-tert-butyl-5'-methylphenyl)-5-chlorobenzotriazole, 2-(2'-hydroxy-3',5'-di-tert-butylbutylphenyl)-5-chlorobenzotriazole, 2-(2'-hydroxy-3',5'-di-tert-amylphenyl)benzotriazole, 2-{2'-hydroxy-3'-(3",4",5",6"-tetrahydrophthalimidemethyl)-5'-methylphenyl}benzotriazole, and 2,2-methylenebis{4-(1,1,3,3-tetramethylbutyl-6-(2H-benzotriazole-2-yl)phenol. The inorganic ultraviolet absorber particles include titanium oxide, zinc oxide, cerium oxide and core-shell type particles wherein the surface of these particles is coated with the organic high-molecular materials.

There are commercially available, as organic ultraviolet absorbers, these absorbers wherein into molecule having ultraviolet absorbing power are introduced into the side chains of the high-molecular materials, such as Yu-daburu UV (Nihon Syokubai Inc.), PUVA (Ohtuka Kagaku K.K.) and ULS-935LH and ULS-1935LH (Ippohsya Yushi Kougyo K.K.). These high-molecular ultraviolet absorbers of side chain type do not cause any migration and bleeding and are excellent in a long term use. Therefore, it is preferable that the absorbers should be used in open-air application.

Any high-molecular materials used in the ultraviolet absorbing layer can be used as long as they are compatible with a low-molecular or high-molecular ultraviolet absorber. Any inorganic ultraviolet absorber can be used, so long as it can be dispersed. It is possible to improve the dispersion properties by adding a dispersant.

Protective layer 5 is used to protect the liquid crystal recording layer, and it is necessary for protective layer 5 to have a high fastness property. This protective layer is usually formed in a thickness of about 0.5 to 10 µm by using a coating agent of mixed resin compositions comprising silicone resins, and prepolymers, oligomers, monomers and the like having polymerisable unsaturated bond or epoxy groups. The ultraviolet absorbing power may be added to the protective layer and the inorganic ultraviolet absorber particles may be dispersed in the protective layer.

Now description will be made to the process for creating or erasing characters or images on the information record medium. Creating or erasing characters or images on the information record medium is performed by application of heat or of heat and electric field. Application of heat to the information display medium may be performed by use of a heating plate, a heating roller, a thermal head, an optical means and the like. Cooling speed for quenching or gradual cooling may be controlled depending on heating temperature, heating time or a cooling apparatus used.

Figure 5:
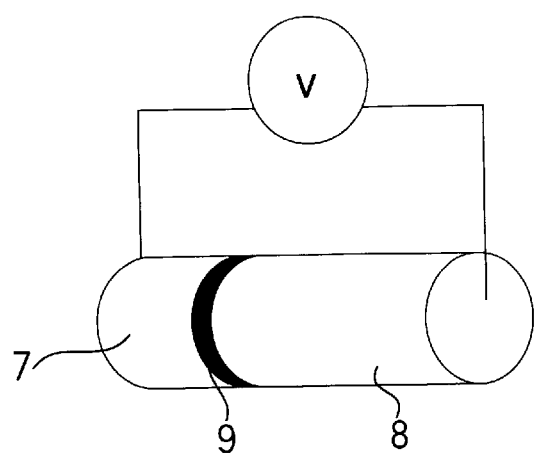
FIG. 5 is a conceptual view illustrating a roller for applying an electric field for use in erasing an image display on an information display medium according to the present invention.

Application of electric field to the information display medium may be performed by use of a corona charging apparatus, a flow of ion, an electrostatic roller, an electrostatic head and the like. In case where the information display medium includes the conductive layer 3 on the substrate 2 as in the above-mentioned embodiments, or the substrate 2 itself is electrically conductive, a roller for applying electric field as shown in FIG. 5 or a plate for applying electric field as shown in FIG. 6 may be used. Referring to FIG. 5 the roller for applying electric field (hereafter referred to as "electric field-applying roller") consists of two electrically conductive roller sections 7 and 8 coupled together through an insulation gap 9. When applying electric voltage across the roller sections 7 and 8 while they are contact with the information display medium then the electric field produced through the roller section 7 and the conductive layer 3 or the substrate 2 and the roller section 8 is applied to the recording layer 4. Referring to FIG. 6 the plate for applying electric field (hereafter referred to as "electric field-applying plate") consists of two electrically conductive plate sections 10 and 11 coupled together through an insulation gap 12. When applying electric voltage across the plate sections 10 and 11 while they are contact with the information display medium then the electric field produced through the plate section 10 and the conductive layer 3 or the substrate 2 and the plate section 11 is applied to the recording layer 4.

Erasing of image is performed by applying heat to the information display medium, as described above, and then, applying electric field, as also described above, while the liquid crystal recording layer is at the temperature in the range of liquid crystal phase. The liquid crystal layer presents homeotropic orientation, as shown in FIG. 2, and the liquid crystal recording layer becomes colorless. It is possible to completely erase the image on the information display medium by applying heat and electric field entirely on the surface thereof. Alternatively the image on the information display medium may partially be erased by applying heat partially on the surface of the information display medium, but applying electric field entirely thereon, and vice versa.

Recording of image is performed in colorless condition by only applying heat according to the process as described above. When applying heat to the liquid crystal recording layer beyond the temperature for liquid crystal phase then the orientation of the liquid crystal becomes disturbed so that the heat applied portion presents the dichromatic pigment color. In such case there is two kinds of orientation states for the liquid crystal present. Firstly, if the heat is applied until some liquid crystal phase temperature or isotropic liquid temperature is reached and then it is quenched, the liquid crystal is randomly orientated, as shown in FIG. 3, to present the dichromatic pigment color. The liquid crystal recording layer in this case provides transmission characteristic. Secondly, if the heat is applied until some liquid crystal phase temperature or isotropic liquid temperature is reached and then it is gradually cooled, the liquid crystal forms a domain, as shown in FIG. 4, to present the dichromatic pigment color. The liquid crystal recording layer in this case provides shielding characteristic. The information display medium that has some image thermally recorded thereon is applied again both heat and electric field in order to change from the state where the liquid crystal in the recording layer is randomly oriented to the state where the liquid crystal is aligned under electric field to enter the transparent condition or erased condition.

According to the process as above, a colored image can be formed on a colorless background. Alternatively a colorless image may be formed on a colored background by reversibly performing the image creation and erase operations.

Accordingly the creation and erase of image can be performed at will by repeated operations of applying heat or heat and electric field.

The concrete structure of the information displaying medium of this invention will be described in connection with an embodiment of production.

EXAMPLE 1

Coating solution for liquid crystal recording layer is prepared by mixing 100 weight part of high-molecular liquid crystal LCP 105 available from Melk Corporation and 3 weight part of dichromatic pigment NKX—available available from Nippon Kanko Shikiso K.K. in 240 weight part of tetrahydrofuran (THF). This coating solution is applied over polyethylene terephthalate (PET) film having Al layer formed on the top surface thereof by means of bar coater to form a film so that the film thickness after drying may be 5 mm ethanol solution comprising 50 weight % of a mixture of 100 weight part of ultraviolet rays curing type resin NK-OLIGO U-6HA available form Shin Nakamura Kagaku K.K. and 5 weight part of Irgacure 907 available from Ciba Geigy Corporation is applied onto the film by means of bar coater to form a protective layer so that the film thickness of the protective layer after irradiating ultraviolet rays may be 2.5 mm.

When the information recording medium is heated up to 130° C. and under a condition of 50 Hz and 100 V heat and electric field are applied to the information recording medium by means of an electric field applying plate as shown in FIG. 6, the displaying section becomes colorless. The reflection density measured by Macbeth reflecting densitometer is 0.6. When printing is made to the information recording medium by means of thermal head with energy of 0.34 mJ/dot, it takes black color. The reflection density of the black colored portion is 1.2. Even after preserving the information displaying medium for 96 hours at 80° C., there us absorbed no change in reflection density of colored portion and colorless portion. Moreover, the information displaying medium after preserved at high temperature is erasable and printable and the above mentioned conditions.

EXAMPLE 2

Four types of coating solution for liquid crystal recording layer are prepared by respectively adding low-molecular liquid crystal ZLI-4792, available from Merck Corporation, of 10, 20, 30 and 40% by weight of high-molecular liquid crystal to a solution comprising a mixture of 100 weight part of high-molecular liquid crystal LCP105, available from Merck Corporation, and 3 weight part of dichromatic pigment NKX-1366 available from Nippon Kanko Shikiso K.K. in 240 weight part of tetrahydrofuran (THF). Each of coating solutions is applied over polyethylene terephthalate (PET) film having Al layer formed on the top surface thereof by means of bar coater to form a film so that the film thickness after drying may be 5 mm. ULS-1935 LH is applied onto the film by means of bar coater so that the film thickness after drying may be 1.5 mm. Ethanol solution comprising 50% by weight of a mixture of 100 weight part of ultraviolet rays curing type resin NK-OLIGO U-6HA available from Shin Nakamura Kagaku K.K. and 5 weight part of Irgacene 907 available from Ciba Geigy Corporation is applied onto the film by means of bar coater to form a protective layer so that the film thickness of the protective layer after irradiation by ultraviolet rays may be 2.5 mm.

When the information recording medium produced in the above mentioned process is heated up to 130° C. and electric field are applied to the information recording medium by means of an electric field applying plate as shown in FIG. 6, the information recording medium having low-molecular components added therein exhibit lower threshold voltages. The experimental results are shown in Table 1 of FIG. 7. Increase of the amount of low-molecular liquid crystal added to high molecular liquid crystal results in lower strength of the applied film. In the information recording medium having the amount of low-molecular component added larger than 20%, when it is heated up to 130° C., there occur wrinkles. Moreover, in the information recording medium having the amount of low-molecular liquid crystal added larger than 30%, there occurs phase separation between low-molecular liquid crystal and high-molecular liquid crystal, whereby any good applied film cannot be obtained. Judging from this results, it should be noted that the amount of low-molecular liquid crystal or low-molecular component added may be preferably 30% by weight or below.

EXAMPLE 3

Five types of coating solution for liquid crystal recording layer are prepared by respectively adding ultraviolet rays curing type resin NK Ester A-TTM-3 available from Shin Nakamura Kagaku K.K. and an initiator, Irgacure 907 available from Ciba Geigy Corporation (mixing rate: resin/initiator=95 weight part/5 weight part) of 10, 20, 30, 40 and 50% of the total amount of high-molecular liquid crystal and low-molecular liquid crystal to a solution comprising a mixture of 100 weight part of high-molecular liquid crystal LCP 105, available from Merck Corporation, 25 weight part of low-molecular molecular liquid crystal ZLI-4792 available from Merck Corporation, and 3 weight part of dichromatic pigment NKX-1366, available from Nippon Kanko Shikiso K.K. in 240 weight part of tetrahydrofuran (THF). Each of coating solutions is applied over polyethylene terephthalate (PET) film having Al layer formed on the top surface thereof by means of bar coater to form a film so that the film thickness after drying may be 5 mm. ULS-1935LH is applied onto the film by means of bar coater so that the film thickness after drying may be 1.5 mm. Ethanol solution comprising 50% by weight of a mixture of 100 weight part of ultraviolet rays curing type resin NK-OLIGO U-6HA available from Shin Nakamura Kagaku K.K. and 5 weight part of Irgacure 907 available from Ciba Geigy Corporation is applied onto the film by means of bar coater to form a protective layer so that the film thickness of the protective layer after irradiating ultraviolet rays may be 2.5 mm.

When the information recording medium is heated up to 130° C. and under a condition of 50 Hz and 50V heat and electric field are applied to the information recording medium by means of an electric field applying plate as shown in FIG. 6 for erasing and then printing is made to the information recording medium by means of thermal head with energy of 0.34 mJ/dot. From these results, it has been found that in the liquid crystal recording layer having resins of larger than 10% added therein there is produced no wrinkle, as produced in Example 2. However, it has been found that increase of the amount of resin added leads to lower contrast due to melting of dichromatic pigment into resin. Changes in colored density and colorless density due to adding of resin are shown in FIG. 8. Moreover, in adding of resin of larger than 20%, there occurs phase separation between resin and high-molecular liquid crystal, thereby resulting in deteriorating resolution. From these results, it should be noted that the amount of resin added to the liquid crystal recording layer may be preferably equal to or smaller than 20%.

EXAMPLE 4

Six types of coating solution for liquid crystal recording layer are prepared by respectively adding filler, Seriguard SC-6832-J available from Nippon Muki Kagaku Kogyo K.K. of 5, 10, 15, 20, 25 and 30% of the total amount of high-molecular liquid crystal and low-molecular liquid crystal to a solution comprising a mixture of 100 weight part of high-molecular liquid crystal LCP 105 available from Merck Corporation, 10 weight part of low-molecular molecular liquid crystal ZLI-4792 available from Merck Corporation and 3 weight part of dichromatic pigment NKX-1366 available from Nippon Kanko Shikiso K.K. in 240 weight part of tetrahydrofuran (THF). Each of coating solution is applied over polyethylene terephthalate (PET) film having Al layer formed on the top surface thereof by means of bar coater to form a film so that the film thickness after drying may be 5 mm. ULS-1935LH is applied onto the film by means of bar coater so that the film thickness after drying may be 1.5 mm. Ethanol solution comprising 50% by weight of a mixture of 100 weight part of ultraviolet rays curing type resin NK-OLIGO U-6HA available from Shin Nakamura Kagaku K.K. and 5 weight part of Irgacure 905 available from Ciba Geigy Corporation is applied onto the film by means of bar coater to form a protective layer so that the film thickness of the protective layer after irradiating ultraviolet rays may be 2.5 mm.

Figures 9, 10:
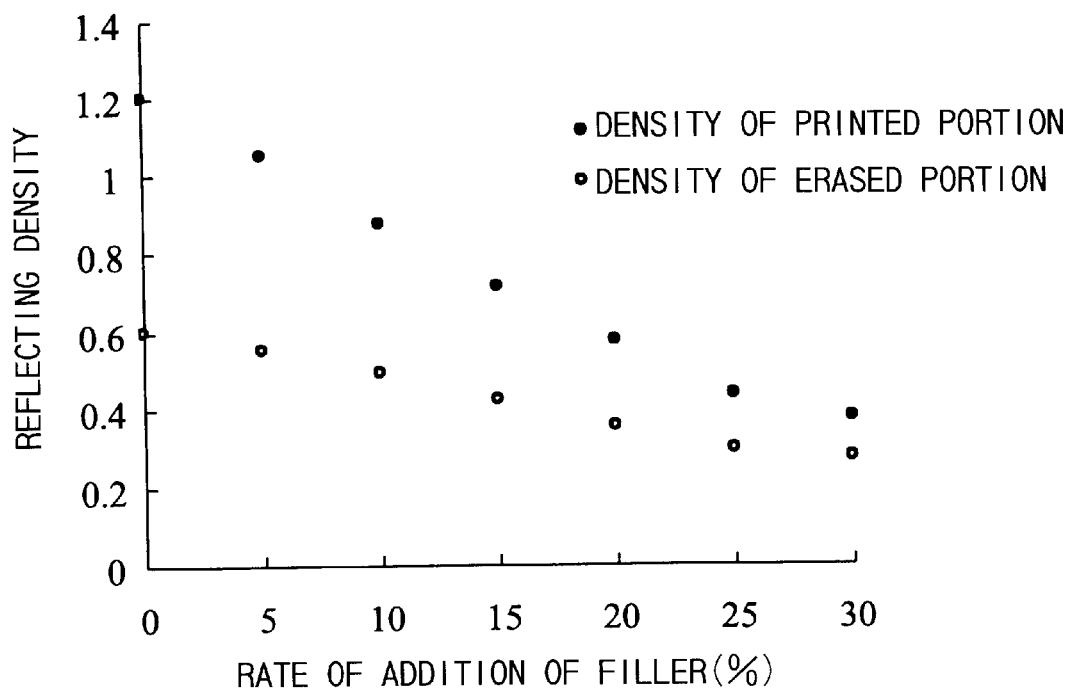
FIG. 9 is a graph showing a change in density of colored or colorless state with addition of a filler.
FIG. 10 is a table 2 representing measurement result for density of erased portion in sixth and seventh embodiments.

When the information recording medium is heated up to 130° C. and under a condition of 50 Hz and 100V heat and electric field are applied to the information recording medium by means of an electric field applying plate as shown in FIG. 6 for erasing and then printing is made to the information recording medium by means of thermal head with energy of 0.34 mJ/dot. From these results, it has been found that in the liquid crystal recording layer having filler of larger than 5% added therein there is produced no wrinkle, as produced in Example 2. Changes in colored concentration and colorless concentration due to adding of filler are shown in FIG. 9. Increase of the amount of filler added leads to lowering of the rate of high-molecular liquid crystal, pigment, low-molecular component, etc. in the recording layer, thereby resulting in deteriorating resolution. From these results, it should be noted that the amount of filler added may be preferably 20% by weight or below.

EXAMPLE 5

Eight types of coating solution for liquid crystal recording layer are prepared by respectively adding Frolard FC-43 available from Sumitomo 3M Corporation of 0.5, 1, 2, 3, 4, 5, 6 and 7% by weight to a solution comprising a mixture of 100 weight part of high-molecular liquid crystal LCP 105, available from Merck Corporation, 10 weight part of low-molecular liquid crystal ZLI-4792 available from Merck Corporation and 3 weight part of dichromatic pigment NKX-1366 available from Nippon Kanko Shikiso K.K. in 240 weight part of tetrahydrofuran (THF). Each of coating solutions is applied over polyethylene terephthalate (PET) film having Al layer formed on the top surface thereof by means of bar coater to form a film so that the film thickness after drying may be 5 mm.

The cohesiveness of liquid crystal high molecules in the applied liquid crystal recording layer is lowered by adding fluorine surface-active agent, thereby resulting in improved wetness to the electrically conductive layer. However, it has been found that adding of the amount of fluorine surface-active agent larger than 5% by weight leads to frothy paint and adherence between the upper and lower layers is deteriorated. From these results, it should be noted that the amount of fluorine surface-active agent to be added may be preferably 5% by weight or below of liquid crystal high molecule.

EXAMPLE 6

Coating solution for liquid crystal recording layer is prepared by mixing 100 weight part of high-molecular liquid crystal LCP 105 available from Melk Corporation, 100 weight part of low-molecular liquid crystal ZLI-4792 available from Merck Corporation, 3 weight part of dichromatic pigment NKX-1366 available from Nippon Kanko Shikiso K.K., 12 weight part of ultraviolet rays curing type resin NK Esthel A-TMM-3 available from Shin Nakamura Kagaku K.K., 0.6 weight part of Irgacure 907 available from Ciba Geigy Corporation, 6 weight part of a filler, Seriguard SC-6832-J available from Nippon Muki Kagaku Kogyo K.K. and 0.5 weight part of a filler, Frolard FC-430 available from Sumitomo 3M Corporation in 240 weight part of tetrahydrofuran (THF). This coating solution is applied over white color polyethylene terephthalate (PET) film having ITO layer formed on the top surface thereof by means of bar coater to form a film so that the film thickness after drying may be 5 mm. A solution prepared by mixing 20 weight part of Seriguard SC-6832-J available from Nippon Muki Kagaku Kogyo K.K. in 100 weight part of ULS-1935 LH is applied onto the film by means of bar coater so that the film thickness after drying may be 1.5 mm. Ethanol solution comprising 50% by weight of a mixture of 100 weight part of ultraviolet rays curing type resin NK-OLIGO U-6HA available from Shin Nakamura Kagaku K.K. and 5 weight part of Irgacure 907 available from Ciba Geigy Corporation is applied onto the film by means of bar coater to form a protective layer so that the film thickness of the protective layer after irradiating ultraviolet rays may be 2.5 mm.

EXAMPLE 7

Coating solution for liquid crystal recording layer is prepared by mixing 100 weight part of high-molecular liquid crystal LCP 105 available from Melk Corporation, 10 weight part of low-molecular liquid crystal ZLI-4792 available from Merck Corporation, 3 weight part of dichromatic pigment NKX-1366 available from Nippon Kanko Shikiso K.K., 12 weight part of ultraviolet rays curing type resin NK Ester A-TMM-3 available from Shin Nakamura Kagaku K.K., 0.6 weight part of Irgacure 907 available from Ciba Geigy Corporation, 6 weight part of a filler, Seriguard SC-6832-J available from Nippon Muki Kagaku Kogyo K.K. and 0.5 weight part of a filler, Frolard FC-430 available from Sumitomo 3M Corporation in 240 weight part of tetrahydrofuran (THF). This coating solution is applied over transparent polyethylene terephthalate (PET) film having ITO layer formed on the top surface thereof by means of bar coater to form a film so that the film thickness after drying may be 5 mm. A solution prepared by mixing 20 weight part of Seriguard SC-6832-J available from Nippon Muki Kagaku Kogyo K.K. in 100 weight part of ULS-1935 LH is applied onto the film by means of bar coater so that the film thickness after drying may be 1.5 mm. Ethanol solution comprising 50% by weight of a mixture of 100 weight part of ultraviolet rays curing type resin NK-OLIGO U-6HA available from Shin Nakamura Kagaku K.K. and 5 weight part of Irgacure 907 available from Ciba Geigy Corporation is applied onto the film by means of bar coater to form a protective layer so that the film thickness of the protective layer after irradiating ultraviolet rays may be 2.5 mm. Then, white color polyethylene terephthalate film is laminated except for the center portion.

Comparison Example 1

After the information recording medium of Examples 6 and 7 are heated up to 130° C., an electric field of 50 Hz and 50V is applied to the information recording medium by means of an electric field applying plate as shown in FIG. 6. The density of the erased portion is measured by Macbeth reflecting densitometer. The measurement values are shown in Table 2 of FIG. 10. The results show that the background density is lowered due to introduction of air layer.

Examples of high-molecular liquid crystal which may be advantageously used as a liquid crystal composition for the recording layer of the liquid crystal type reversible information displaying medium according to this invention will be explained.

One example of the high-molecular liquid crystal has a side chain represented by the following general formula (1):

$R^1$ is a hydrogen atom, a $C_{1-8}$ straight or branched chain alkyl, alkoxy, alkoxyalkyl or fluoroalkyl group, a cyano group, a halogen atom, a carboxyl group or a hydroxyl group. The examples of alkyl groups include methyl, ethyl, propyl, butyl, isobutyl and pentyl, and the examples of alkoxy groups include the alkoxy groups corresponding to the above alkyl groups, the examples of alkoxyalkyl groups include methoxymethyl, methoxyethyl, methoxypropyl and ethoxymethyl, the examples of fluoroalkyl groups include fluoroalkyl groups corresponding to the above alkyl groups such as trifluoromethyl and pentafluoroethyl. The halogen atom includes a fluorine, a chlorine and a bromine, and it is preferable that the halogen atom should be a fluorine wherein the stability of the liquid crystal having fluorine is superior to others.

$X^1$ and $X^2$ are independently a hydrogen atom, a halogen atom or a cyano group. The halogen atom includes a fluorine, a chlorine and a bromine, and it is preferable that the halogen atom should be a fluorine wherein the stability of the liquid crystal having fluorine is superior to others.

When ring D is present at the end of the side chains, it is preferable that $X^1$ and $X^2$ should be present at ortho positions.

l is 1 to 20, and preferably 1 to 14, and much preferably 2 to 12, in view of the fact that to be added the orientation stability sufficient for this high-molecular liquid crystal can be provided.

One methylene group may be blocked by —$CH_2O$—, —$OCH_2$—, —COO—, —OCO— and the like groups so long as the effect of the present invention is not adversely affected.

m is 0 or 1, and it is preferable that m should be 1.

n, p, q and r are independently 0 to 2, preferably 0 or 1. And n+p+q+r≧1, and preferably 4≧n+p+q+r≧1, and more preferably, 4≧n+p+q+r≧2 in order to improve the liquid crystal property and stiffness of this high-molecular liquid crystal.

This high-molecular liquid crystal may have a single side chain represented by the above general formula (1). This high-molecular liquid crystal may also have 2 or more kinds of the side chains represented by the above general formula (1) which are different from each other.

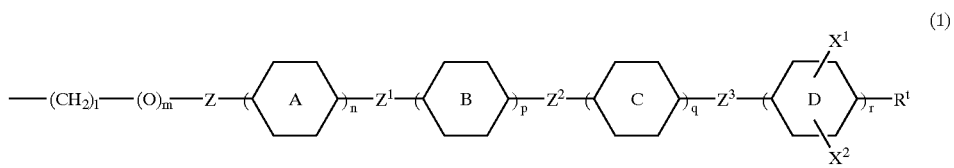

(1)

In the general formula (1), rings A, B, C and D are independently an aromatic or aliphatic hydrocarbon 6 membered ring, or a heterocyclic or fused ring. When these rings are a hydrocarbon 6 membered ring or a heterocyclic 6 membered ring, the examples of the rings include 1,4-phenylene, 1,4-cyclohexylane, 1,4-cyclohexenylene, dioxanylene, pyridylene and pyrimidine. The examples of the fused ring include naphthylene and the like. It is preferable that rings A, B, C and D should be a 1,4-phenylene or a 1,4-cyclohexylene.

Z, $Z^1$, $Z^2$ and $Z^3$ are independently a single bond, —$CH_2O$—, —$OCH_2$—, —COO—, —OCO—, —$CH_2$—, —$CH_2CH_2$—, —CH=CH—, —CF=CF— or —C≡C—. In these groups, it is preferable that Z, $Z^1$, $Z^2$ and $Z^3$ should be —$CH_2O$—, —$OCH_2$—, —COO— or —$CH_2$—.

This high-molecular liquid crystal can have a side chain represented by the above general formula (1) as a mesogen, so that, it can provide the reversible information display medium having the excellent electric field response. Two or more kinds of side chains which are different from each represented by the above general formula (1) can be used, because the liquid crystal phase temperature and the isotopic liquid temperature can be controlled, therefore, reversible information display media having the excellent storability at high temperature can be obtained.

It is desirable that the high-molecular liquid crystal should have a backbone chain obtained by addition polymerization of the unsaturated compounds. The examples of such backbone chains include a polyacrylate backbone chain, a polymethacrylate backbone chain, a polychloroacrylate backbone chain, a polyvinyl alcohol backbone chain and a polyvinyl ether backbone chain. The backbone chain of this high-molecular liquid crystal may comprise two or more kinds of repeated units which are different from each other, such as a poly(acrylate/methacrylate) backbone chain. It is preferable that the backbone chain of the high-molecular liquid crystal should be a polyacrylate main chain or a polymethacrylate backbone chain because of glass transition temperature (Tg) or easiness in polymerization.

It is desirable that the number average molecular weight of the high-molecular liquid crystal should be 2,000 or above because of the mechanical strength of the recording layer of the reversible information display medium having the recording layer formed by using this high-molecular liquid crystal. It also is preferable that the molecular weight of this high-molecular liquid crystal should be 500,000 or lower because of the solubility of the high-molecular liquid crystal in a solvent when the high-molecular liquid crystal is dissolved into the solvent to produce the reversible information display medium composition and because of the viscosity of the solution. It is preferable that the number average molecular weight of the high-molecular liquid crystal should be 5,000 to 100,000.

This high-molecular liquid crystal can be obtained by polymerizing one or more kinds of monomers having the molecular site represented by the general formula (1), if necessary with other monomers in the range not to adversely affect the effect of the present invention.

The examples of monomers usable to produce the high-molecular liquid crystal include the following compounds. However, it should be notes that the monomers should not be limited to these compounds:

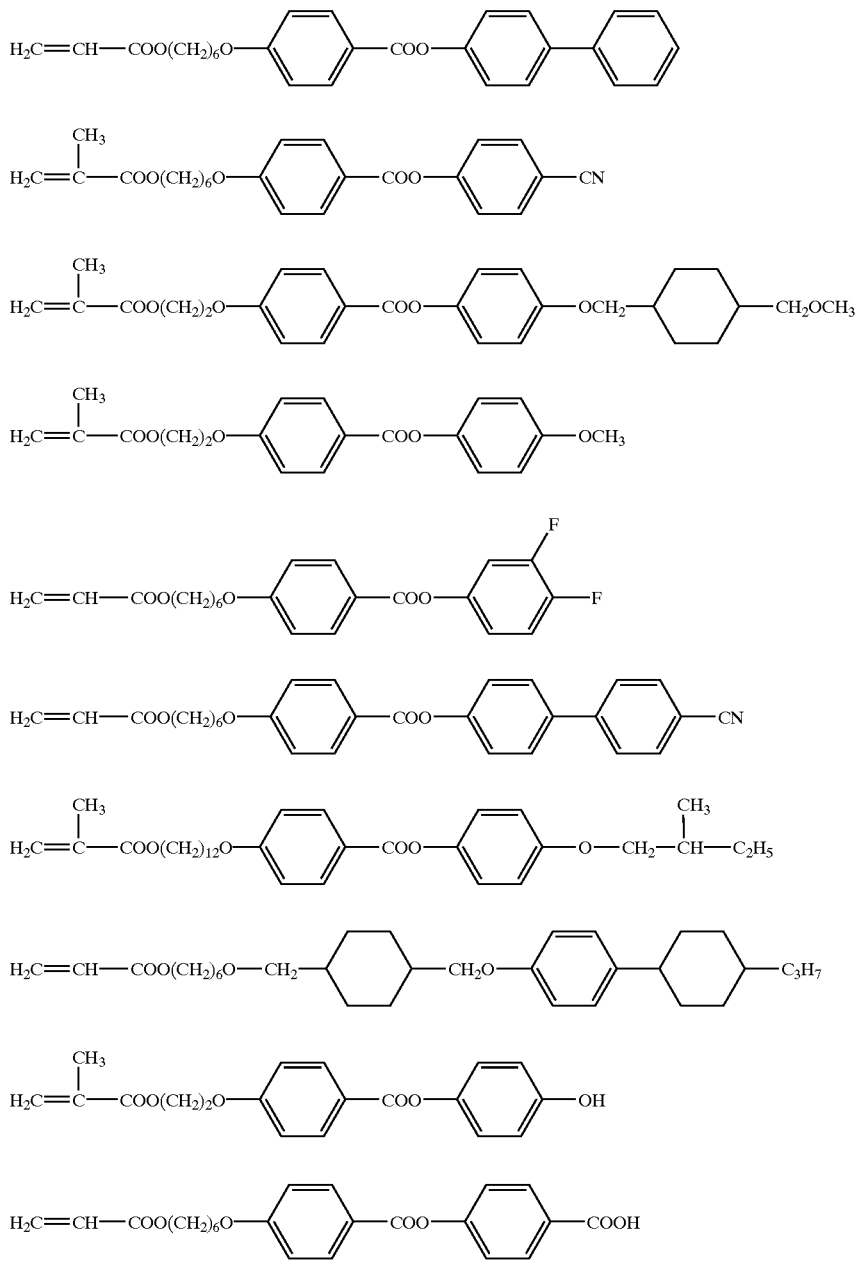

In this connection, a high-molecular liquid crystal can be also obtained by introducing a cross-linkable reaction site into a high-molecular liquid crystal obtained from the above compounds, and then polymerizing with another polymerizable compound having e.g., a hydroxyl, carboxyl, mercaptan, epoxy group or amines which functional group is addition polymerizable with a cross-liking agent. When the recording layer of the reversible information display medium is formed by using this high-molecular liquid crystal, the layer having a three-dimensional network can be obtained. Therefore, it is possible that the faster recording layer does not flow even at high temperature.

This high-molecular liquid crystal can be used singly to form the recording layer of the reversible information display medium. It is desirable that the high-molecular liquid crystal should be used together the low-molecular molecular liquid crystal which has compatibility with the high-molecular liquid crystal in view of a response property and the like of the recording layer to be formed.

The low-molecular compounds usable in the reversible information display medium are desirably those low molecular compounds which are compatible with the high-molecular liquid crystal and which are stable and do not separate at a low temperature. In general, the low-molecular compound having the similar structure to mesogen skeleton of a high-molecular liquid crystal has a high compatibility with the high-molecular liquid crystal. It is also desirable that the low-molecular compound should reduce the viscosity in the liquid crystal phase of the high-molecular liquid crystal in view of improvement in response property of the recording layer to be formed. As a low-molecular compound, a single compound or 2 or more kinds of compounds may be used together, so that the isotopic liquid temperature or the liquid crystal phase temperature may be controlled in a desirable range.

It is preferable that the low-molecular compound should be represented by the following general formula (2):

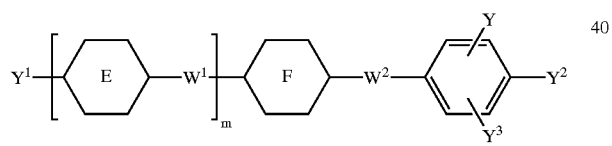

(2)

In the general formula (2), as defined above, $Y^1$ is a hydrogen atom or a $C_{1-8}$ straight or branched chain alkyl, alkoxy, alkenyl, alkenyloxy, alkoxyalkyl, alkanoyloxy or alkoxycarbonyl group. Rings E and F is independently a benzene, cyclohexane, cyclohexene, pyrimidine or dioxane ring.

$W^1$ and $W^2$ is independently a single bond, —CH$_2$O—, —OCH$_2$—, —COO—, —OCO—, —CH$_2$—, —CH$_2$CH$_2$—, —CH=CH— or —C≡C—. It is preferable that $W^1$ and $W^2$ should be a single bond, —CH$_2$O—, —OCH$_2$—, —COO— or —C≡C—.

As defined above, Y is a hydrogen or halogen atom. $Y^2$ is a cyano group, a halogen atom, a $C_{1-8}$ straight or branched chain alkyl, alkoxy, alkenyl, alkenyloxy, alkoxyalkyl or alkanoyloxy group or a cyano group. $Y^3$ is a hydrogen atom, a halogen atom or a cyano group.

Furthermore, m is 0 to 2, preferably 0 or 1.

The examples of the low-molecular compound usable in the composition include the compounds represented by the following general formulas, however, the low-molecular compound should not be limited to these compounds:

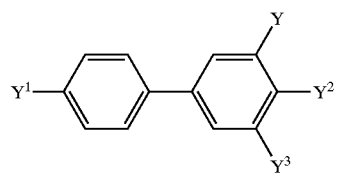

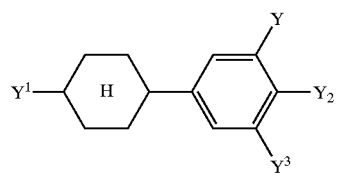

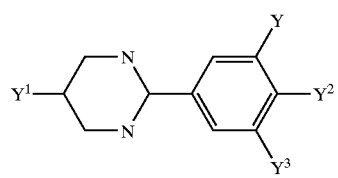

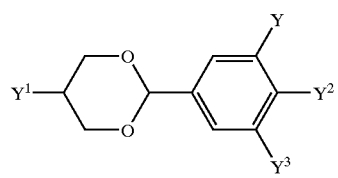

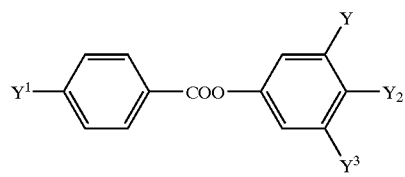

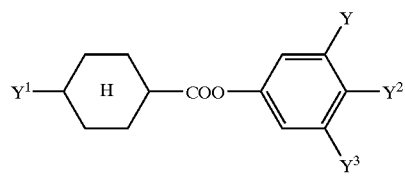

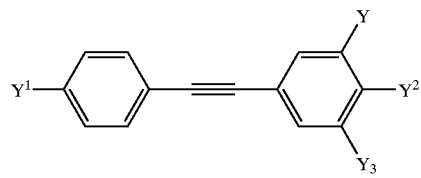

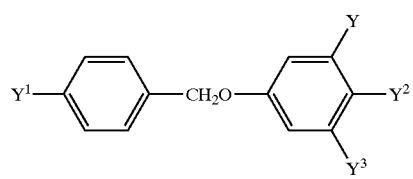

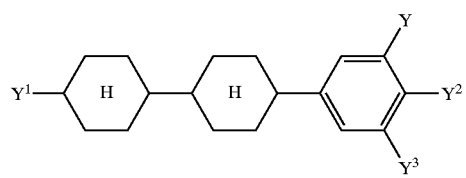

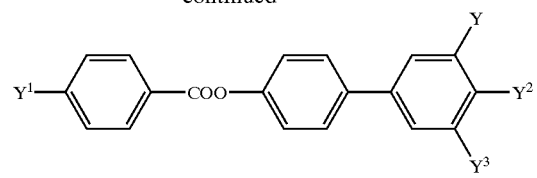

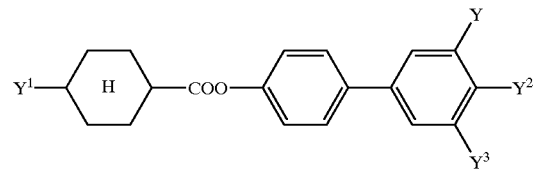

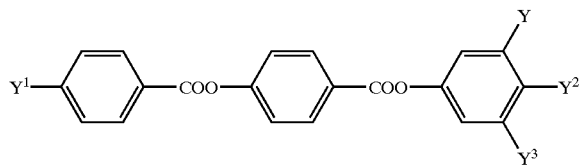

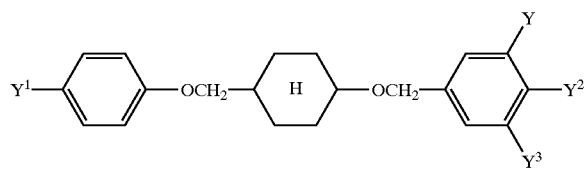

wherein, $Y^1$, Y, $Y^2$ and $Y^3$ are as defined above.

In the compositions, it is possible that the amounts of the high-molecular liquid crystal and low-molecular liquid crystal to be used are properly decided depending on the kinds, the compatibility level and the like of the high-molecular liquid crystal and the low-molecular liquid crystal. In general, it is preferable the amount of the high-molecular liquid crystal is 99 to 60% by weight and the amount of the low-molecular liquid crystal is 1 to 40% by weight, based on total weight of the compositions. It is more preferable that the amount of the high-molecular liquid crystal is 95 to 70% by weight and the amount of the low-molecular liquid crystal is 5 to 30%.

Although the above mentioned embodiments have been a laminated type reversible information displaying medium, it will be possible to provide a liquid crystal display in the form of a cell encapsulating high-molecular liquid crystal or a composition including such liquid crystal between electrodes. Moreover, it will be possible to perform recording and erasing of image information by light and electric field in a reversible information displaying medium having a light-heat conversion layer inserted into the layer structure thereof or having infrared rays absorbing pigment introduced into the recording layer thereof.

EXAMPLE 8

High-molecular liquid crystal (number average molecular weight 9000) having a structure as expressed by the following formula I-1: is poured into a cell having the cell thickness of 10 μm.

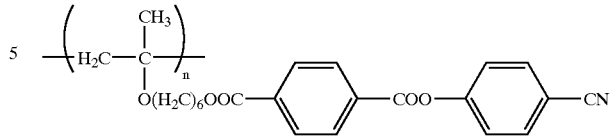

The ni point (isotropic liquid temperature) of this high-molecular liquid crystal is measured. The measurement value is 125° C. Therefore, after the cell is heated up to 125° C., an electric field of 50 Hz and 25V is applied to a portion of the cell. Under such condition, it is cooled. Then it has been found that the portion of the cell to which the electric field was applied takes homeotropic orientation state. Moreover, the cell is heated to 125° C. again and then cooled. It has been found that the portion of the cell which took homeotropic orientation state takes domain state. Moreover, while leaving the cell alone for 24 hours at 60° C., the orientation state is observed in the term of transmittivity and through deflecting microscope. As a result, there has been found no change in either of homeotropic orientation state and domain state.

From these results, it is apparent that the high-molecular liquid crystal is useful for a reversible information displaying medium employing heat and electric field.

EXAMPLE 9

Compositions a to c for reversible information displaying medium are prepared by mixing a high-molecular liquid crystal as expressed by the above formula I-1 and a low-molecular compound as expressed by the following formula II-1 at the rates (% by mass) as shown in Table 3 of FIG. 11.

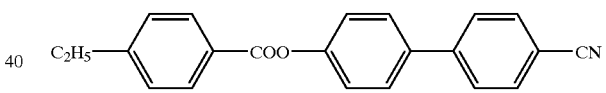

The prepared compositions a to c are poured respectively into a cell having the cell thickness of 10 μm. Their ni points and threshold voltages are measured. The results of measurements are shown in Table 3 of FIG. 11. From the results, it is apparent that the adding of low-molecular compound to high-molecular liquid crystal provides an improved response.

While leaving the compositions alone for 48 hours at room temperature, the stability of phase observed. While in the composition C there occurs phase separation, the compositions a and b are stable. For the compositions a and b left alone for 24 hours at 60° C. with homeotropic orientation state and liquid crystal domain state, there has been found no change in orientation states as observed in the term of transmittivity and by deflecting microscope.

From these results, it is apparent that adding of low-molecular compound to high-molecular liquid crystal provides an improved response speed while maintaining a good conservativity or storability.

EXAMPLE 10

Compositions are prepared by adding dichromatic pigment NKX-1366 available from Nippon Kanko Shikiso K.K. to high-molecular liquid crystal I-1 as used in Example 8 and the compositions a and b as prepared in Example 2 at a rate of 1% of the total mass of the composition. The prepared compositions are poured into a cell having the cell thickness of 10 μm. The homeotropic orientation as formed by application of heat and electric field and transmittivity of isotropic liquid state as formed by heating up to ni point are measured. The measurement of transmittivity is performed by use of light having a wavelength of 670 mm.

For comparison, compositions are prepared by adding dichromatic pigment to low-molecular liquid crystal (ZLI-4792 available from Melk Corporation) as mentioned above. For the compositions, similar measurement is made. The results of measurement are shown in Table 4 of FIG. 12.

From these results, it is apparent that the transmittivity in homeotropic orientation of either of the mixtures is similar and high-molecular liquid crystal and low-molecular liquid crystal take similar orientation states. Moreover, for the transmittivity in isotropic liquid state, the transmittivity of high-molecular liquid crystal is lower than that of low-molecular molecular liquid crystal. This is because the high-molecular liquid crystal forms liquid crystal domain structure which causes diffusion deflecting.

EXAMPLE 11

Coating solution for the recording layer of reversing information displaying medium is prepared by mixing 100 displaying medium by means of thermal head with energy of 0.34 mJ/dot, the printed section takes black color. The reflection density of the printed section measured is 1.2. Even after preserving the reversible information displaying medium for 96 hours at 80° C., there is observed no change in reflection density of printed section and not printed section of the displaying section. Moreover, heat and electric field are applied to the displaying section of the reversible information displaying medium preserved at high temperature to erase the printed section. No difference in reflection density between the erased section and the not initially printed section is recognized.

EXAMPLE 12

Compositions d to f are reversible recording medium are prepared by mixing a high-molecular liquid crystal having a structure as expressed by the following formula I-2 (a polymer of 90% by mol of a monomer corresponding to repetition unit having side chain A and 10% by mol of a monomer corresponding to repetition unit having side chain B: number average molecular weight 12,000) and a low molecular compound as expressed by the following formula II-2 or the following formula II-3 at the rates (% by mass) as shown in Table 5 of FIG. 13.

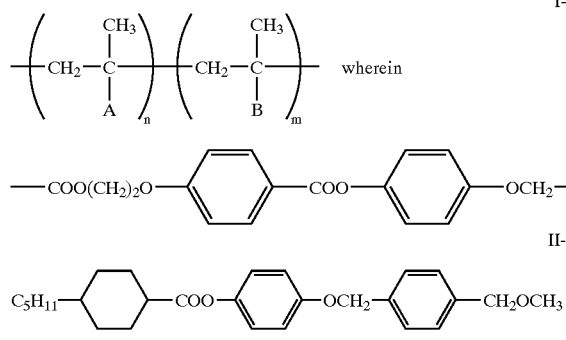

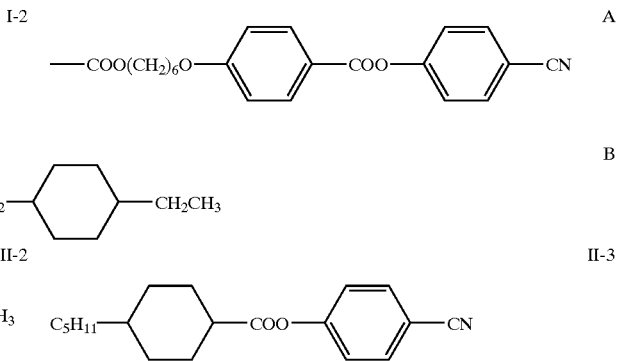

weight part of the composition a as prepared in Example 9 and 3 weight part of dichromatic pigment NKX-1366 available from Nippon Kanko Shikiso K.K. in 240 weight part of tetrahydrofuran (THF). This coating solution is applied over polyethylene terephthalate (PET) film having Al layer formed on the top surface thereof by means of bar coater to form a film so that the film thickness after drying may be 5 μm. Then, ethanol solution comprising 50% by mass of a mixture of 100 weight part of ultraviolet rays curing type resin NK-OLIGO U-6HA available from Shin Nakamura Kagaku K.K. and 5 weight part of cross-linking agent Irgacure 907 available from Ciba Geigy Corporation is prepared. This solution is applied onto the recording layer by means of bar coater to form a protective layer so that the film thickness of the protective layer after drying may be 2.5 μm.

When the produced reversible information displaying medium is heated up to 130° C. and under a condition of 50 Hz and 50V head and electric field are applied to the information displaying medium by means of electrodes as shown in FIG. 6, the displaying section becomes colorless. The reflection density of the displaying section measured by Macbeth reflecting densitometer is 0.6. When printing is made to the displaying section of the reversible information Three types of coating solutions for the recording layer of reversible information displaying medium are prepared by mixing 100 weight part of the respective composition and 3 weight part of dichromatic pigment NKX-1366 available from Nippon Kanko Shikiso K.K. in 240 weight part of tetrahydrofuran (THF). Each of the prepared coating solution is applied over polyethylene terephthalate (PET) film having Al layer formed on the top surface thereof by means of bar coater to form a film so that the film thickness after drying may be 5 μm. Then, ethanol solution comprising 50% by mass of a mixture of 100 weight part of ultraviolet rays curing type resin NK-OLIGO U-6HA available from Shin Nakamura Kagaku K.K. and 5 weight part of cross-linking agent Irgacure 907 available from Ciba Geigy Corporation is prepared. This solution is applied onto the recording layer by means of bar coater to form a protective layer so that the film thickness of the protective layer after drying may be 2.5 μm.

The reversible information display medium thus produced was then heated to the temperature of 130° C. and was applied a thermal electric field at 50V, 50 Hz by use of the electrode as shown in FIG. 6. As the result, a colorless display portion was formed. The reflection density of the display portion was at 0.6 that was measured with a Macbeth reflection density meter. Printing was performed on the display portion of the reversible information display medium by the thermal head at the energy of 0.34 mJ/dot so that the printed portion was colored black. The reflection density of the printed portion was measured at 1.2. After keeping the reversible information display medium at 90° C. for the period of 96 hours, change in reflection density with the time was observed for the printed portion and the remaining portion in the display portion that was not yet printed. Then there was no change in reflection density observed in either of the portions. Next, the reversible information display medium kept at higher temperature was applied a thermal electric field for the purpose of erasing. There is no difference in reflection density observed between the erased portion and the portion that has not initially been printed.

Now, description will be made to an embodiment in which the liquid crystal type reversible information display medium as described above is used for an information display portion of a non-contact IC card.

Recently, great attention has been paid to a non-contact IC card that is effectively used for an information recording card in view of the resource problem, environmental problem and security problem. Unlike a magnetic recording card, the non-contact IC card is capable of transmitting information via an antenna. Therefore, if it is applied to a commutation ticket for a train, the time required for a person to pass through an automatic ticket examiner machine can be shortened.

Such IC card is required to have a display portion formed thereon for displaying and transmitting visual information including internal information and messages. Unlike a magnetic recording card, the IC card is required to provide higher possibility of reuse and repeated use over longer period of time, and the display portion thereon is required to have durability and preservation characteristic for repeated use. In addition, resistant to tampering characteristic is required. Therefore, the liquid crystal type reversible information display medium according to the present invention as described above can advantageously be used for the information display portion of such kind of the non-contact IC card.

However, as described above, the liquid crystal type reversible information display medium according to the present invention includes an electrically conductive layer and a reflective metal layer, and therefore, if it is used for the display portion of the non-contact IC card, the following problems should be solved. First of all, when the non-contact IC card communicates with a read/write unit, any capacitive effect may be caused due to electrostatic capacity between the conductive layer or reflective layer, and the shield layer, antenna and IC chips on the IC card. Therefore, the communication with the external unit may be interfered. In addition, when the non-contact IC card communicates with a read/write unit, an eddy current may flow in the conductive layer or the reflective metal layer due to magnetic field produced by an electromagnetic wave sent by the read/write unit to the non-contact IC card. The eddy current may induce magnetic field that causes canceling of the electromagnetic wave sent by the read/write unit to the non-contact IC card, with the result that the communication may be interfered.

Figure 14:
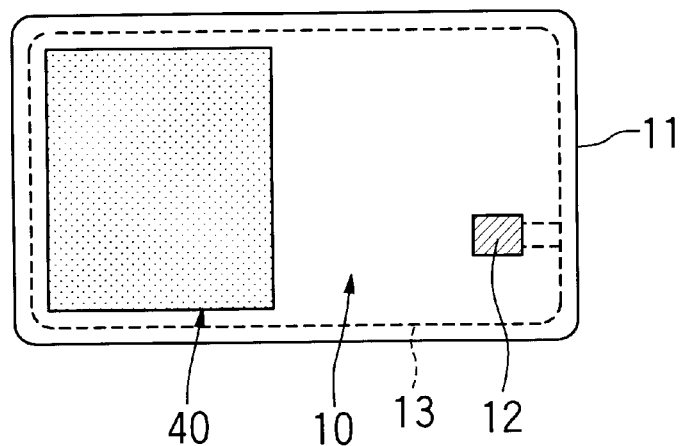
FIG. 14 is a schematic plan view illustrating a non-contact IC card according to one embodiment of the present invention.

FIG. 14 is a schematic plan view illustrating a non-contact IC card in which an area of a rewritable information display portion using the liquid crystal type reversible information display medium according to the present invention is less than 50% of the entire card area in order to solve the above-mentioned problems as much as possible. As shown in FIG. 14, the non-contact IC card 10 includes an IC chip 12 and an antenna 13 buried in a base member 11 as well as an information display portion 40 including an electrically conductive metal reflection layer formed on the surface of the base member 11. According to this embodiment the information display portion 40 is provided substantially in a left-hand half portion of the base member 11 and positioned away from the antenna 13.

Figure 15:
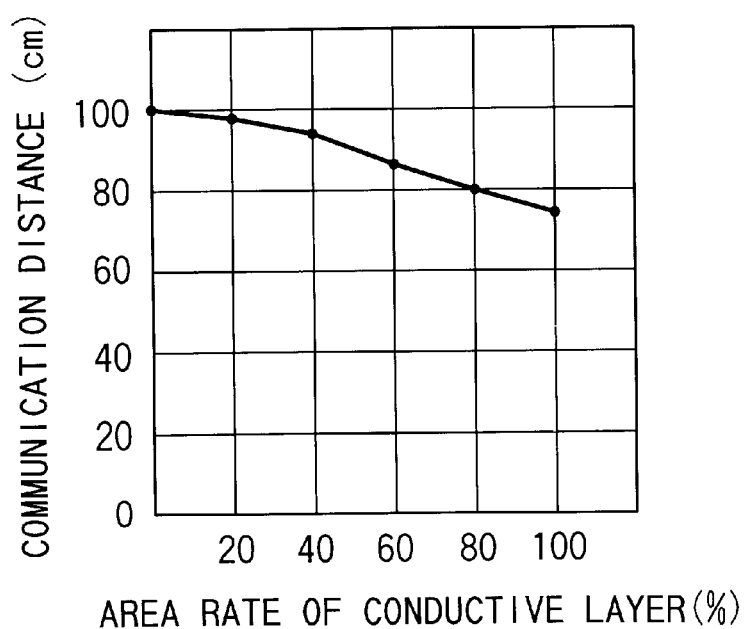
FIG. 15 is a graph representing communication distance over which the communication can be made as the function of changing area of an information display portion on the non-contact IC card in FIG. 14.

FIG. 15 is a graph representing the measurement result for the communication distance over which the communication can be made between the non-contact IC card of FIG. 14 and the read/write unit as an area that the information display portion 40 occupies is changed, in other words, an area of the conductive metal reflection layer (including the information display portion) is changed relative to that of the IC card. In this graph the communication distance represents the relative value, assuming that the communication distance with no metal reflective layer is at 100%. It can be seen in the graph of FIG. 15 that if the area of the metal reflective layer is not greater than 50% of the IC card area then the communication distance of not less than 90% can be assured as compared to the case of no metal reflection layer present.

Figure 16:
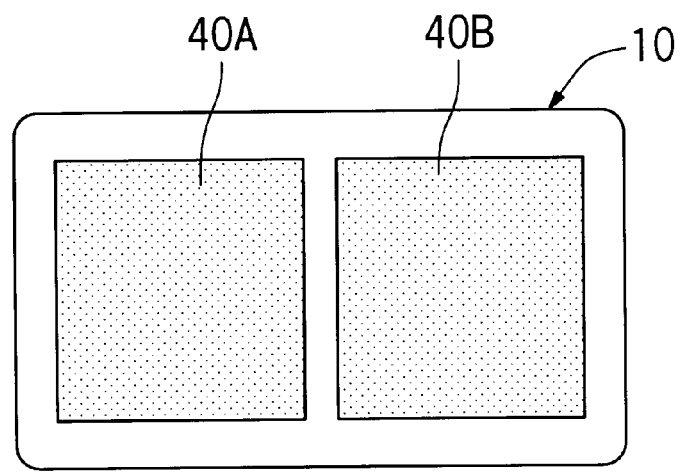
FIG. 16 is a schematic plan view illustrating a non-contact IC card according to another embodiment of the present invention.

FIG. 16 is a schematic plan view illustrating another embodiment of a non-contact IC card according to the present invention. In this embodiment an information display portion including an electrically conductive layer and a metal reflection layer is divided into plural sections so that the total information display area of 40A+40B is kept at the value not greater than 50% of the IC card area. In the example of FIG. 16 the information display portion is divided into two sections, but the present invention is not limited to such number. Therefore, the information display portion can be divided into any number of sections.

Figure 17:
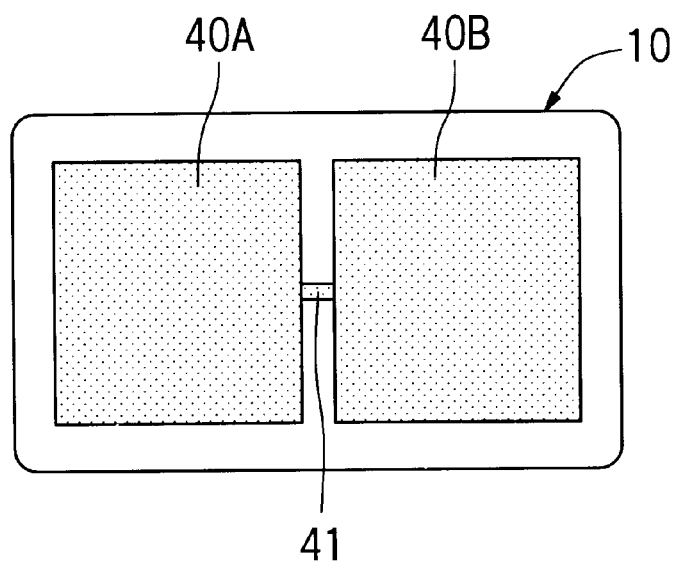
FIG. 17 is a schematic plan view illustrating a non-contact IC card according to further embodiment of the present invention.

In addition, in such case where the information display portion is divided into plural sections as described above, each of the conductive layers and the metal reflection layers in each of the divided information display sections may not necessarily be electrically insulated. Accordingly the information display sections 40A and 40B may be connected to each other via a connection 41 at center portion of the IC card, as shown in FIG. 17.

By dividing the conductive display portion in such manner, the eddy current that may interfere the communication will be induced in each of the sections, with the result that the eddy current that circulates around the periphery of the card and adversely affects can be eliminated.

FIG. 18 is a schematic plan view illustrating further embodiment of a non-contact IC card according to the present invention. In this embodiment an information display portion 40C including an electrically conductive layer and a metal reflection layer is formed at either one side of a centerline 6 passing in parallel to the short sides of an IC card 10. In such configuration an eddy current circulating in the center portion of the card can be eliminated.

FIG. 19 is a schematic plan view illustrating yet further embodiment of a non-contact IC card in which an electrically conductive information display portion 40D having the same area as that of the information display portion 40C in FIG. 18 is positioned at the center of the IC card 10. FIG. 20 is a table 6 representing measurement results for the communication distance for both non-contact IC cards in FIGS. 18 and 19. As can be seen in the table of FIG. 20 it is advantageous that the conductive information display portion is positioned away from the center portion of the card in order to effectively reduce any electromagnetic wave shielding effect, even if the area of the conductive information display portion is kept constant.

It is more preferable that the conductive information display portion 40 is positioned so as not to overlap with the antenna 13 and the IC chip 12, as in the embodiment of FIG. 14. Because such configuration effectively prevents any interfering from occurring due to the electrostatic coupling between the conductive sections, the antenna and the IC chip to provide a stable communication. Furthermore, the IC chip may some times have a convex surface, which is defective in that its contact with the energy supplying apparatus such as the thermal head, heating roller and electric field applying unit becomes poor upon erasing the characters, thereby leading to any unevenly erased portion. In order to avoid such defect it is preferable to position the information display portion away from the IC chip.

Industrial Applicability

It is apparent from the foregoing that a liquid crystal type reversible information display medium according to the present invention can perform a recording operation with heating and an erasing operation with heating and application of electric field so that older information can be erased while keeping only necessary information. In addition, it has fast response, good conservation at higher and lower temperature, resistant to light, higher durability, good visual perceiving, and resistant to tampering characteristics. Accordingly it can effectively be used for a display portion of a recording medium for long-term use, such as a magnetic card, an IC card, etc.

A non-contact IC card including a rewritable information display portion according to the present invention can erase any unnecessary information and can display the necessary information without any adverse effect to the IC card characteristics. Therefore, it is extremely effective for use with a commutation ticket for a train and an entry ticket.

What is claimed is:

1. A reversible information display medium of liquid crystal type comprising a recording layer comprising a liquid crystalline composition, whose main component exhibits a glass state at room temperature, and a dichroic dye, said liquid crystalline composition being a high-molecular polymer liquid crystal or a mixture of a high-molecular polymer liquid crystal and a low-molecular liquid crystal, the high molecular polymer liquid crystal having an average molecular weight in the range of 5,000 to 100,000 the contents of said low-molecular liquid crystal in said liquid crystal composition being 30% by weight or below of said high-molecular polymer liquid crystal, said liquid crystalline composition exhibiting an isotropic liquid state or a liquid crystal domain state by the application of heat and further exhibiting a homeotropic orientation state by the application of both heat and electric field, said high-molecular polymer liquid crystal having a backbone chain obtained by addition polymerization of unsaturated compounds, and a side chain represented by the following general formula (1):

(1)

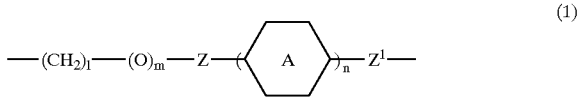

-continued

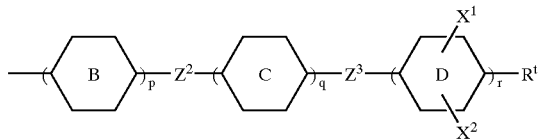

wherein rings A, B, C and D independently represent an aromatic or aliphatic hydrocarbon 6 membered ring, or a heterocyclic or fused ring;

Z, $Z^1$, $Z^2$ and $Z^3$ independently represent a single bond, $-CH_2O-$, $-OCH_2-$, $-COO-$, $-OCO-$, $-CH_2-$, $-CH_2CH_2-$, $-CH=CH-$, $-CF=CF-$ or $-C\equiv C-$;

$R^1$ represents a hydrogen atom, a $C_{1-8}$ straight or branched chain alkyl, alkoxy, alkoxyalkyl or fluoroalkyl group, a cyano group, a halogen atom, a carboxyl group or a hydroxyl group;

$X^1$ and $X^2$ each independently represents a hydrogen atom, a halogen atom or a cyano group;

l is 1 to 20;

m is 0 or 1;

n, p, q and r are independently 0 to 2; and $n+p+q+r \geq 1$, and said low-molecular liquid crystal being represented by the following general formula (2):

(2)

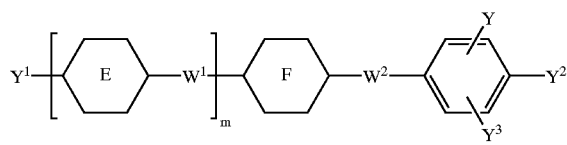

wherein $Y^1$ represents a hydrogen atom or a $C_{1-8}$ straight or branched chain alkyl, alkoxy, alkenyl, alkenyloxy, alkoxyalkyl, alkanoyloxy or alkoxycarbonyl group;

rings E and F independently represent a benzene, cyclohexane, cyclohexene, pyrimidine or dioxane ring;

$W^1$ and $W^2$ independently represent a single bond, $-CH_2O-$, $-OCH_2O-$, $-COO-$, $-OCO-$, $-CH_2-$, $-CH_2CH_2-$, $-CH=CH-$ or $-C\equiv C-$;

Y represents a hydrogen or halogen atom;

$Y^2$ represents a cyano group, a halogen atom, a $C_{1-8}$ straight or branch chained alkyl, alkoxy, alkenyl, alkenyloxy, alkoxyalkyl or alkanoyloxy group or a cyano group;

$Y^3$ represents a hydrogen atom, a halogen atom or a cyano group; and m is 0 to 2.

2. The reversible information display medium of liquid crystal type according to claim 1, wherein said recording layer is formed on an electrically conductive substrate.

3. The reversible information display medium of liquid crystal type according to claim 7, wherein said electrically conductive substrate is transparent and a reflecting layer or a white color layer is formed on the bottom surface of substrate through an air layer.

4. The reversible information display medium of liquid crystal type according to claim 1, wherein said recording layer is formed on an electrically conductive layer formed on a substrate.

5. The reversible information display medium of liquid crystal type according to claim 4, wherein said substrate and said electrically conductive layer are transparent and a reflecting layer or a white color layer is formed on the bottom surface of said substrate through an air layer.

6. The reversible information display medium of liquid crystal type according to claim 4, wherein said electrically conductive layer is transparent, an air layer is provided between said substrate and said electrically conductive layer, and a reflecting layer or a white color layer is formed on the top surface of said substrate.

7. The reversible information display medium of liquid crystal type according to claim 1, wherein an ultraviolet rays absorbing layer or a protective layer is formed on said recording layer.

8. The reversible information display medium of liquid crystal type according to claim 1, wherein fluorine surface-active agent of 5% by weight of said liquid crystal composition is contained in said recording layer.

9. The reversible information display medium of liquid crystal type according to claim 1, wherein high polymer resin of 20% by weight or below of said liquid crystal composition is contained in said recording layer.

10. The reversible information display medium of liquid crystal type according to claim 1, wherein filler of 20% by weight or below of said liquid crystal composition is contained in said recording layer.

11. The reversible information display medium of liquid crystal type according to claim 1, wherein ultraviolet rays absorbing agent is contained in said recording layer.

12. A non-contact IC card comprising a rewritable information displaying section utilizing a liquid crystal type reversible information displaying medium as defined in claim 1 and an antenna section coupled to an IC tip section.

13. The non-contact IC card according to claim 12, wherein the area of the electrically conductive layer or the metallic reflecting layer of said information displaying section is equal to or smaller than 50% of the area of said card.

14. The non-contact IC card according to claim 12, wherein the electrically conductive layer or the metallic reflecting layer of said information displaying section is divided into two or more regions, and the area of each of said regions is equal to or smaller than 50% of the area of said card.

15. The reversible information display medium of liquid crystal type according to claim 1, wherein the mixture of high-molecular and low-molecular liquid crystal is used, and the low molecular liquid crystal has a structure similar to a side chain of the high-molecular polymer liquid crystal and the low-molecular liquid crystal has a compatibility with the high-molecular liquid crystal such that the viscosity of the liquid crystal phase is lowered, which thereby improves response time.

* * * * *